US008955794B2

(12) United States Patent
Mackin et al.

(10) Patent No.: US 8,955,794 B2
(45) Date of Patent: Feb. 17, 2015

(54) BLEED AIR SYSTEMS FOR USE WITH AIRCRAFTS AND RELATED METHODS

(71) Applicant: The Boeing Company, Chicago, IL (US)

(72) Inventors: Steve G. Mackin, Bellevue, WA (US); David W. Foutch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/951,181

(22) Filed: Jul. 25, 2013

(65) Prior Publication Data
US 2014/0250898 A1 Sep. 11, 2014

Related U.S. Application Data

(63) Continuation-in-part of application No. 13/357,293, filed on Jan. 24, 2012.

(51) Int. Cl.
*F02C 3/13* (2006.01)
*F02C 6/08* (2006.01)
*F02C 7/32* (2006.01)

(52) U.S. Cl.
CPC ... *F02C 3/13* (2013.01); *F02C 6/08* (2013.01); *F02C 7/32* (2013.01)
USPC ................ 244/53 R; 244/134 R

(58) Field of Classification Search
USPC ............. 244/53 R, 134 C, 134 B
See application file for complete search history.

(56) References Cited

U.S. PATENT DOCUMENTS

| 2,800,002 | A | 7/1957 | Seed |
| 4,015,438 | A | 4/1977 | Kinsell et al. |

(Continued)

FOREIGN PATENT DOCUMENTS

| CA | 2773229 | 5/2011 |
| CN | 102596719 | 7/2012 |

(Continued)

OTHER PUBLICATIONS

14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.

(Continued)

*Primary Examiner* — Tien Dinh
*Assistant Examiner* — Keith L Dixon
(74) *Attorney, Agent, or Firm* — Hanley, Flight & Zimmerman, LLC

(57) ABSTRACT

Bleed air systems for use with aircrafts and related methods are disclosed. An example apparatus includes a turbo-compressor including a compressor has a compressor inlet fluidly coupled to a low-pressure compressor of an aircraft engine and an intermediate port of a high-pressure compressor of the aircraft engine. The compressor inlet to receive fluid from either the low-pressure compressor or the high-pressure compressor based on a first system parameter of the aircraft. A turbine has a turbine inlet fluidly coupled to the intermediate port of the high pressure compressor and a high-pressure port of the high pressure compressor of the aircraft engine. The turbine inlet to receive fluid from either the intermediate port of the high-pressure compressor or the high-pressure port of the high-pressure compressor based on a second system parameter of the aircraft.

20 Claims, 13 Drawing Sheets

(56) References Cited

U.S. PATENT DOCUMENTS

| | | | |
|---|---|---|---|
| 4,262,495 | A | 4/1981 | Gupta et al. |
| 4,487,034 | A | 12/1984 | Cronin et al. |
| 4,503,666 | A | 3/1985 | Christoff |
| 4,684,081 | A | 8/1987 | Cronin |
| 5,036,678 | A | 8/1991 | Renninger et al. |
| 5,114,100 | A * | 5/1992 | Rudolph et al. ......... 244/134 C |
| 5,143,329 | A * | 9/1992 | Coffinberry ................ 244/209 |
| 5,524,848 | A * | 6/1996 | Ellsworth .................. 244/118.5 |
| 5,813,630 | A * | 9/1998 | Williams ................... 244/118.5 |
| 5,899,805 | A | 5/1999 | Dowd et al. |
| 5,967,461 | A * | 10/1999 | Farrington ................ 244/118.5 |
| 6,189,324 | B1 | 2/2001 | Williams et al. |
| 6,305,156 | B1 | 10/2001 | Lui |
| 6,401,473 | B1 | 6/2002 | Ng et al. |
| 6,491,254 | B1 | 12/2002 | Walkinshaw et al. |
| 6,526,775 | B1 | 3/2003 | Asfia et al. |
| 6,629,428 | B1 | 10/2003 | Murry |
| 6,681,592 | B1 | 1/2004 | Lents et al. |
| 6,688,558 | B2 * | 2/2004 | Olsen et al. .............. 244/134 R |
| 6,796,131 | B2 * | 9/2004 | Sampson ......................... 62/87 |
| 6,942,183 | B2 * | 9/2005 | Zywiak ..................... 244/118.5 |
| 6,997,013 | B2 * | 2/2006 | Jones .............................. 62/655 |
| 7,207,521 | B2 | 4/2007 | Atkey et al. |
| 7,467,524 | B2 | 12/2008 | Brutscher et al. |
| 7,607,318 | B2 * | 10/2009 | Lui et al. ......................... 62/402 |
| 7,618,008 | B2 * | 11/2009 | Scherer et al. ............ 244/117 R |
| 7,727,057 | B2 * | 6/2010 | Beier et al. ...................... 454/76 |
| 8,047,470 | B2 * | 11/2011 | Porte ......................... 244/134 B |
| 2001/0032472 | A1 | 10/2001 | Buchholz et al. |
| 2003/0005718 | A1 | 1/2003 | Mitani et al. |
| 2003/0051492 | A1 | 3/2003 | Hartenstein et al. |
| 2003/0177781 | A1 | 9/2003 | Haas et al. |
| 2004/0172963 | A1 | 9/2004 | Axe et al. |
| 2009/0277445 | A1 | 11/2009 | Markwart |
| 2010/0107594 | A1 | 5/2010 | Coffinberry et al. |
| 2011/0107777 | A1 | 5/2011 | Atkey et al. |
| 2012/0186267 | A1 | 7/2012 | Coffinberry et al. |
| 2013/0187007 | A1 | 7/2013 | Mackin et al. |

FOREIGN PATENT DOCUMENTS

| | | |
|---|---|---|
| DE | 102006042584 | 3/2008 |
| EP | 2470425 | 7/2012 |
| JP | 2013510042 | 3/2013 |
| WO | 9920528 | 4/1999 |
| WO | 0037313 | 6/2000 |
| WO | 0123724 | 4/2001 |
| WO | 2007093389 | 8/2007 |
| WO | 2011056285 | 5/2011 |

OTHER PUBLICATIONS

International Searching Authority, "International Search Report," issued in connection with International Application No. PCT/US2010/047357, mailed Dec. 3, 2010, 5 pages.

International Searching Authority, "Written Opinion of the International Searching Authority," issued in connection with International Application No. PCT/US2010/047357, mailed Dec. 3, 2010, 5 pages.

The United States Patent and Trademark Office, "Office Action," issued in connection with U.S. Appl. No. 12/614,441, mailed on Apr. 26, 2013, 21 pages.

International Bureau, "International Preliminary Report on Patentability," issued in connection with International Application No. PCT/US2010/047357, mailed May 08, 2012, 6 pages.

European Patent Office, "Communication Under Rule 71(3) EPC," issued in connection with European Application No. 10 750 0141-1753, mailed on Jun. 28, 2013, 5 pages.

The United States Patent and Trademark Office, "Requirement for Restriction/Election," issued in connection with U.S. Appl. No. 13/357,293, mailed on Sep. 25, 2013, 5 pages.

The United States Patent and Trademark Office, "Non-Final Office Action," issued in connection with U.S. Appl. No. 13/357,293, mailed on Feb. 7, 2014, 21 pages.

Extended European Search Report, issued by the European Patent Office in connection with European Patent Application No. 14175279.0 on Dec. 3, 2014, 9 pages.

* cited by examiner

BLEED AIR SYSTEMS FOR USE WITH AIRCRAFTS AND RELATED METHODS

RELATED APPLICATION

This patent arises from a continuation-in-part of U.S. application Ser. No. 13/357,293 which was filed on Jan. 24, 2012, entitled "Bleed Air Systems for use with Aircrafts and Related Methods" and is hereby incorporated herein by reference in its entirety.

FIELD OF THE DISCLOSURE

The present disclosure relates generally to aircrafts and, more particularly, to bleed air systems for use with aircrafts and related methods.

BACKGROUND

Commercial aircrafts or jetliners typically employ an environmental control system to pressurize a passenger cabin of the aircraft and/or thermal anti-icing systems to provide heated air for anti-icing applications. Air supply to these systems is typically provided by bleed air extracted from or provided by a compressor of an aircraft engine. To meet pressure and/or temperature demands of the various aircraft systems, bleed air is often extracted from a high stage of a low-pressure compressor of the aircraft engine. For example, bleed air is often extracted from an eighth stage compressor of an aircraft engine. The pressurized bleed air is then often cooled via a precooler prior to providing the bleed air to a system of the aircraft (e.g., environmental control system). Thus, much of the energy spent by the engine to produce the bleed air is wasted when cooling the bleed air via the precooler. As a result, high-pressure bleed air extracted from the compressor may significantly reduce the efficiency of the engine.

To reduce extraction of bleed air, some known systems employ a turbo-compressor that receives ambient air from an atmospheric inlet. The turbo-compressor pressurizes the ambient air prior to supplying the various aircraft systems. However, the atmospheric inlet produces drag. Additionally, the atmospheric inlet is often susceptible to icing and, thus, requires an anti-icing system that increases costs and system complexity. Further, the compressor may have to be relatively large to produce a pressure change sufficient to power the systems of an aircraft.

SUMMARY

An example apparatus includes a turbo-compressor. The turbo-compressor includes a compressor has a compressor inlet fluidly coupled to a low-pressure compressor of an aircraft engine and an intermediate port of a high-pressure compressor of the aircraft engine. The compressor inlet to receive fluid from either the low-pressure compressor or the high-pressure compressor based on a first system parameter of the aircraft. A turbine has a turbine inlet fluidly coupled to the intermediate port of the high pressure compressor and a high-pressure port of the high pressure compressor of the aircraft engine. The turbine inlet to receive fluid from either the intermediate port of the high-pressure compressor or the high-pressure port of the high-pressure compressor based on a second system parameter of the aircraft.

Another example apparatus includes a turbo-compressor having a compressor and a turbine. A first inlet passageway to fluidly couple a low-pressure port from an aircraft engine to a compressor inlet of the compressor. A second inlet passageway to fluidly couple a first intermediate port from the aircraft engine to the compressor inlet. A third inlet passageway to fluidly couple a high-pressure port from an aircraft engine to a turbine inlet of the turbine. A fourth inlet passageway to fluidly couple a second intermediate port from the aircraft engine to the turbine inlet.

An example method includes fluidly coupling a compressor inlet of a turbo-compressor to a low-pressure bleed air source provided by a low-pressure compressor of an aircraft engine via a first inlet passageway and fluidly coupling the compressor inlet to an intermediate bleed air source provided by a high-pressure compressor of the aircraft engine via a second inlet passageway. The method includes fluidly coupling a turbine inlet of the turbo-compressor to a high-pressure bleed air source provided by the high-pressure compressor of the aircraft engine via a third inlet passageway and fluidly coupling the turbine inlet and the intermediate bleed air source provided by high-pressure compressor via a fourth inlet passageway.

The features, functions and advantages that have been discussed can be achieved independently in various embodiments or may be combined in yet other embodiments further details of which can be seen with reference to the following description and drawings.

Figure 1A:
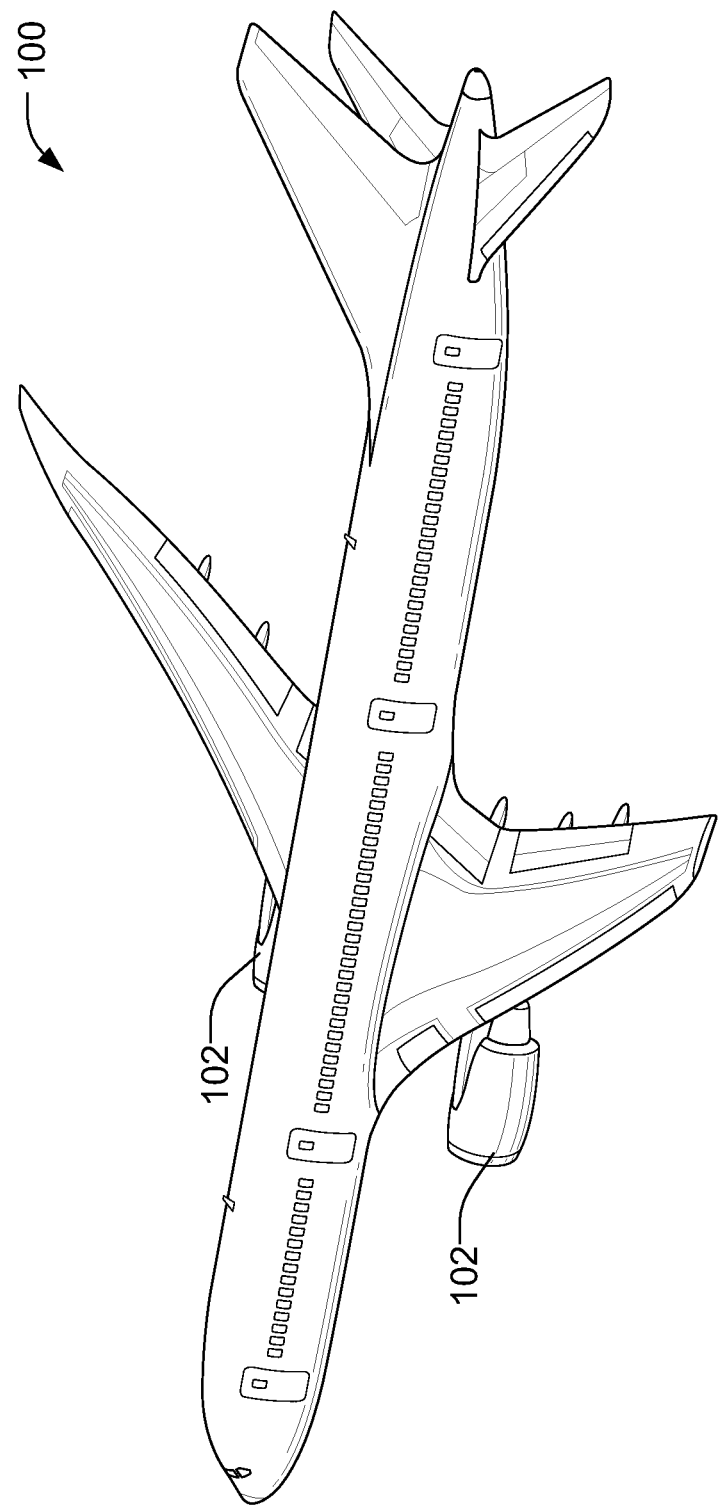
FIG. 1A is an illustration of an example aircraft that may embody the examples described herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Engine bleed air is typically provided by a compressor of an aircraft engine to power various systems of the aircraft. For example, bleed air is often used to power an environmental control system (ECS) and/or a thermal anti-icing system of the aircraft. The bleed air is bled from a compressor of the aircraft engine via a bleed port in a housing of a compressor. However, bleed air pressures vary greatly with operating conditions such as, for example, engine speed, operating altitude, etc.

To ensure the bleed air has sufficient pressure and/or temperature to power various systems of the aircraft, the bleed air is often extracted from a first bleed port (e.g., a low-pressure bleed port) of a compressor that provides sufficient pressure for the systems. Additionally, bleed air may also be provided via a high-pressure bleed port when the pressure of the low-pressure bleed air is insufficient to supply the systems. For example, bleed air is often extracted from an eighth stage compressor of an aircraft engine during high engine speeds and from a fifteenth stage compressor during high altitude and/or low engine speed operations. Thus, much of the energy spent by the engine to produce the bleed air may be wasted if not completely used.

Additionally, the bleed air extracted from the engine often exceeds a temperature threshold of the aircraft systems utilizing the bleed air. Thus, the bleed air is cooled prior to supplying the bleed air to, for example, the ECS. To reduce the bleed air temperature, commercial aircrafts typically employ a precooler (e.g., an air-to-air heat exchanger) through which bleed air passes and which is typically located on a pylon adjacent to the engine. A fan operated by the engine of the aircraft provides cool air to the precooler to cool the bleed air prior to supplying the bleed air to the systems of the aircraft. The fan air often is dumped overboard after flowing through the precooler. Thus, cooling the bleed air via the fan often reduces the efficiency of the aircraft engine. Additionally, the precooler typically has a relatively large dimensional envelope, which adds extra weight and requires a fan air scoop and exhaust that produce drag. Thus, the relatively large dimensional envelope of the precooler can also affect the efficiency of the aircraft engine. Additionally or alternatively, an inlet port of the precooler is positioned downstream and/or oriented opposite the engine bleed air port that provides the bleed air to the precooler. Thus, the bleed air is often piped to the inlet of the precooler using tight-bend elbows, which cause energy loss in the bleed air.

In some known examples, compressed air to the various systems of the aircraft is provided via electrically driven compressors. However, electrically driven compressors may not be efficient for relatively smaller aircrafts. In other known examples, a bleed air system employs a turbo-compressor that receives ambient air from an atmospheric inlet. However, the atmospheric inlet produces drag. Additionally, the atmospheric inlet is often susceptible to icing and, thus, requires an anti-icing system that increases costs and system complexity. Further, the compressor may have to be relatively large to produce a pressure change sufficient to power the systems of an aircraft.

Example bleed air systems and related methods disclosed herein employ a turbo-compressor to provide compressed or pressurized air to various systems of an aircraft such as, for example, an environmental control system (ECS), a thermal anti-icing system (e.g., a wing and/or engine, anti-icing system), a pneumatic supply system (to supply pneumatic devices), and/or any other system of the aircraft that requires use of compressed air. Unlike known systems, the example bleed air systems disclosed herein receive relatively lower pressure bleed air (e.g., from a fifth stage compressor) than known bleed air systems such as those described above. As a result, less energy is required from the engine to produce the bleed air. Further, unlike known systems that employ a turbo-compressor, the example bleed air systems and related methods described herein enable use of a relatively smaller turbo-compressor.

Employing an example turbo-compressor system disclosed herein significantly reduces an amount of high-pressure bleed air (or bleed air having relatively higher pressure) needed to satisfy the demand of an environmental control system of an aircraft. More specifically, the bleed air systems and related methods disclosed herein use bleed air having a relatively lower pressure and/or temperature to power systems of an aircraft. For example, some example bleed air systems and related methods disclosed herein employ a turbo-compressor that extracts bleed air from a low-pressure bleed port of a low-pressure compressor stage (e.g., a fifth stage). In other words, the example bleed air systems and related methods disclosed herein extract bleed air from a stage of a compressor that has a relatively lower pressure than the bleed air typically extracted by known systems. By extracting bleed air from a lower compressor stage of the aircraft engine, less energy in the bleed air is wasted, which significantly reduces the specific fuel consumption of the engine.

Thus, with the examples disclosed herein, bleed air is extracted from the engine having relatively lower energy (e.g., temperature) than, for example, an amount of energy in the bleed air extracted in known systems. More specifically, because the turbo-compressor employed by the examples disclosed herein can boost the pressure of the bleed air, bleed air having a relatively lower pressure may be extracted from the engine, requiring less energy from the engine to produce sufficiently pressurized bleed air. In particular, the turbo-compressor increases the pressure of the low-pressure bleed air to a pressure sufficient for use by various systems of the aircraft. As a result, bleed air having less energy (e.g., a relatively lower pressure and/or temperature) may be extracted from the engine (e.g., a core of an engine) than known systems. Extracting bleed air having relatively less energy results in less wasted energy, thereby significantly increasing the fuel efficiency of an aircraft engine (e.g., a turbofan engine).

In some examples, a turbo-compressor disclosed herein is capable of receiving bleed air at different pressures and/or temperatures from different stages of an aircraft engine. For example, when an aircraft engine is operating at a relatively high thrust (e.g., during take-off and/or cruising altitudes), the bleed air from a low-pressure compressor of the aircraft engine may have a higher pressure and/or temperature than, for example, the bleed air from the low-pressure compressor when the engine is operating at a relatively low thrust (e.g., when idle). As a result, bleed air having different pressures and/or temperatures may be utilized during different flight conditions to meet pressure and/or temperature demands of an aircraft control system (e.g., an environmental control system ECS, an anti-icing system, etc.), thereby reducing a dimensional envelope (e.g., size and weight) of the turbo-compressor.

FIG. 1A illustrates an example commercial aircraft 100 having an aircraft engine 102 (e.g., turbofan engines) that may embody aspects of the teachings of this disclosure. FIG.

1B is a sectional view of the example aircraft engine 102 of FIG. 1A. Each engine 102 of the aircraft 100 may employ a dedicated bleed air system 104 and/or may employ a common bleed air system 104. Further, the example bleed air system 104 of FIG. 1B does not employ a precooler. The bleed air system 104 of FIG. 1B provides compressed or pressurized air to an aircraft system 106 such as, for example, an environmental control system 108 (ESC), a thermal anti-icing system 110 (e.g., an engine and/or wing anti-icing system), etc.

Figure 1B:
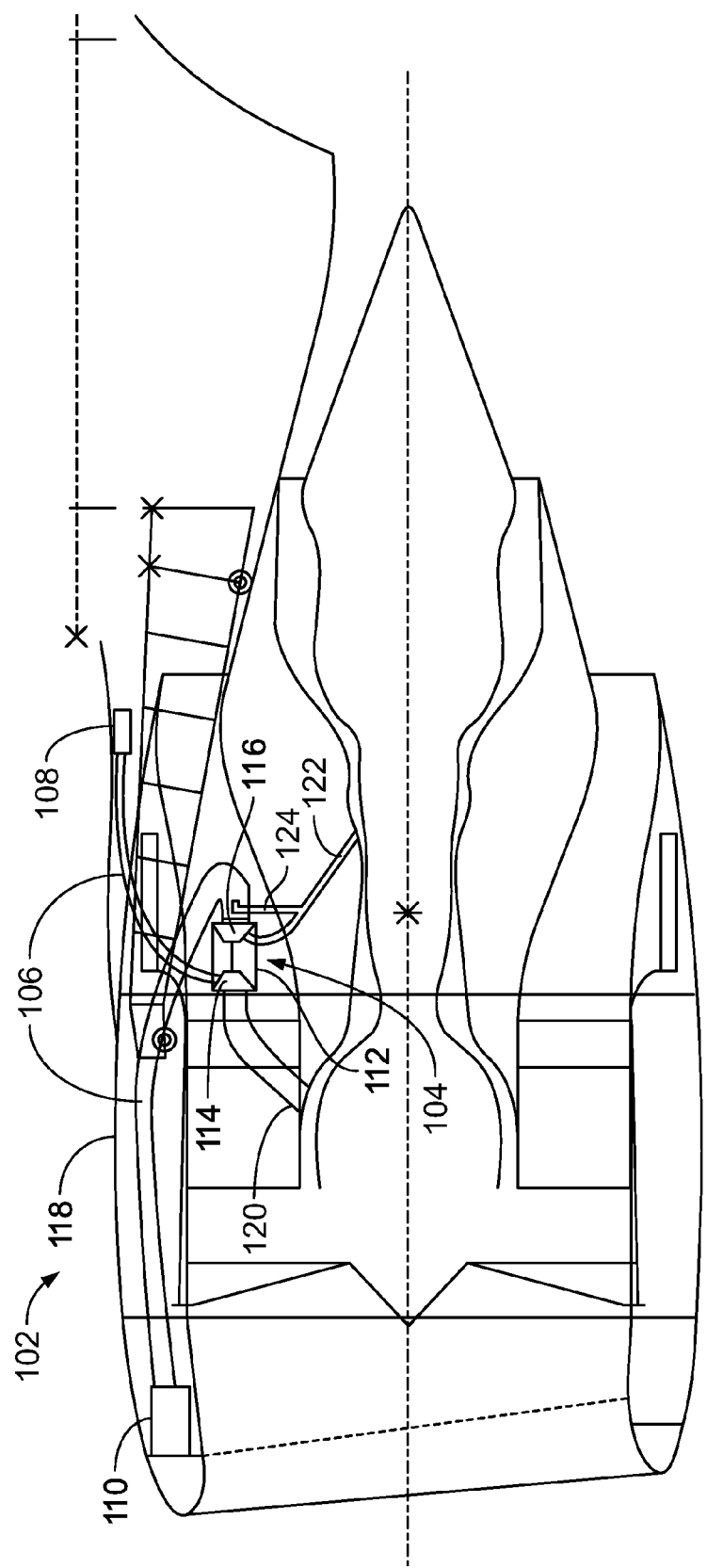
FIG. 1B illustrates an example aircraft engine having an example bleed air system disclosed herein.

Turning in detail to FIG. 1B, the example bleed air system 104 employs a turbo-compressor 112 having a compressor 114 and a turbine 116. As shown in FIG. 1B, the turbo-compressor 112 is disposed within a nacelle 118 of the engine 102. Although the turbo-compressor 112 is disposed within the nacelle 118 as shown in FIG. 1B, in some examples, the turbo-compressor 112 may be disposed at a remote location relative to the nacelle 118 or any other suitable location of the aircraft 100.

The compressor 114 of the turbo-compressor 112 receives low-pressure bleed air from a low-pressure source 120 (e.g., a low-pressure stage of a compressor) of the engine 102. The compressor 114 compresses the bleed air and discharges the compressed bleed air to the ECS 108 of the aircraft 100. The turbine 116 receives high-pressure bleed air from a high-pressure source 122 (e.g., a high-pressure stage of a compressor) of the engine 102 providing bleed air having a higher pressure than the bleed air provided by the low-pressure source 120. Thus, the bleed air provided to the turbine 116 has a relatively higher pressure and/or temperature than the pressure and/or temperature of the bleed air provided to the compressor 114. The high-pressure bleed air operates the turbine 116 which, in turn, operates the compressor 114. The turbine 116 discharges the bleed air at a relatively lower pressure and/or temperature, which is used to supply the thermal anti-icing system 110 of the aircraft 100.

Further, the bleed air system 104 of the illustrated example includes a temperature boost or ejector 124 (e.g., an ejector conduit). The ejector 124 boosts the temperature of the bleed air discharged from the turbine 116 if the temperature of the bleed air is less than a minimum temperature needed for thermal anti-icing operations. One or more control systems, temperature sensors, valves, etc. may be employed to control the flow of bleed air to the anti-icing system 110 via the ejector 124.

Figure 2:
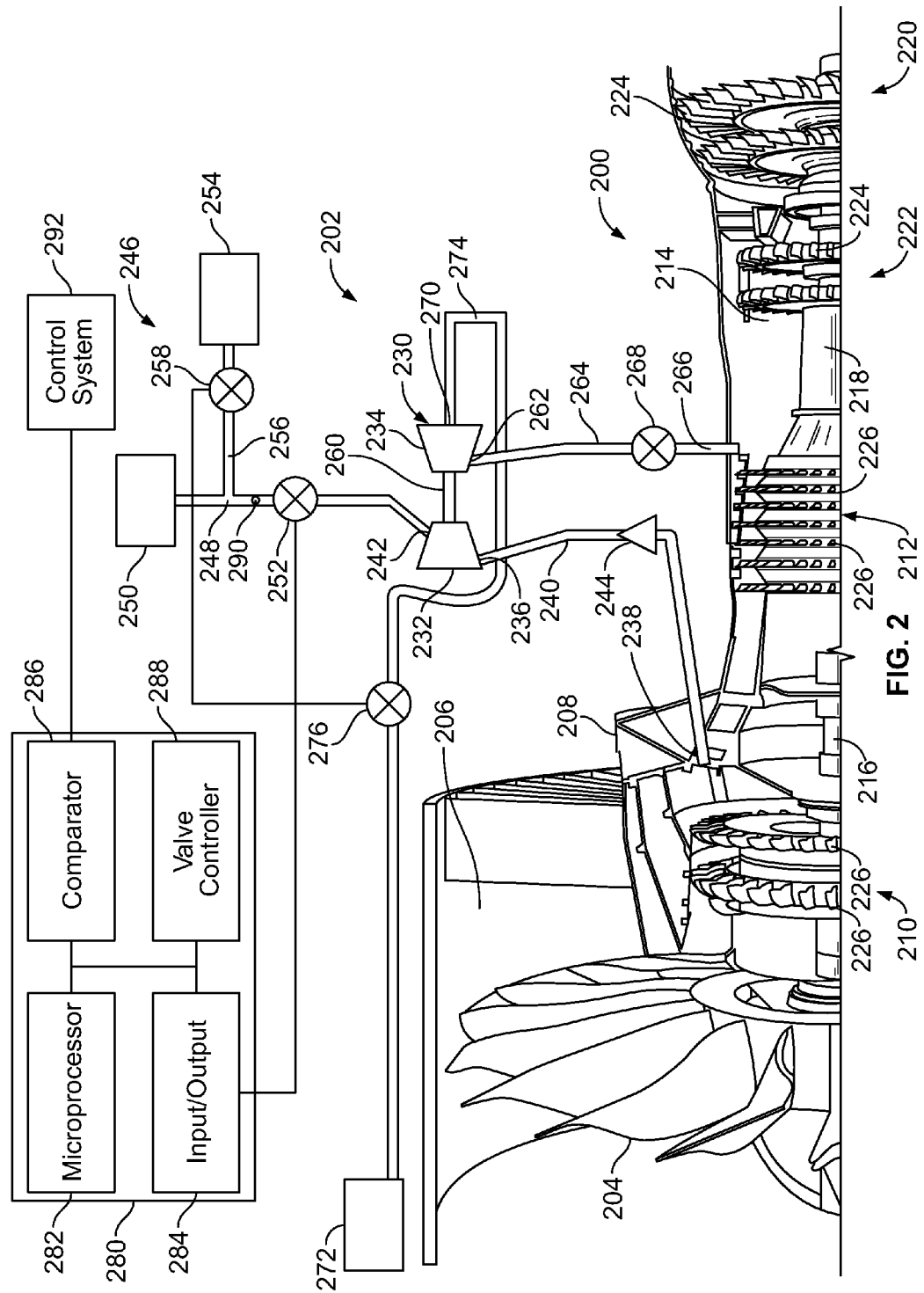
FIG. 2 illustrates another aircraft engine having an example bleed air system disclosed herein.

FIG. 2 is a partial cutaway view of an engine 200 of an aircraft (e.g., the aircraft 100) implemented with an example bleed air system 202 in accordance with the teachings of this disclosure. Referring to FIG. 2, the engine 200 is a gas turbine having a fan 204 that draws air into an intake section 206 and a compressor 208. The compressor 208 may include multiple compressor sections. For example, as shown, the compressor 208 of the illustrated example is a dual-axial compressor that includes a first compressor 210 and a second compressor 212. Additionally, each of the compressors 210 and 212 includes various different compressor stages that progressively increase the pressure of the air as the air flows from the intake section 206 to a combustion chamber 214. For example, the first compressor 210 is a low-pressure compressor that provides relatively low pressure air and the second compressor 212 is a high-pressure compressor that provides relatively high pressure air. The compressors 210 and 212 are coupled to respective shafts 216 and 218. The first shaft 216 is operatively coupled to a low-pressure turbine 220 and the second shaft 218 is operatively coupled to a high-pressure turbine 222.

After exiting the high-pressure compressor 212, the highly pressurized air is provided to the combustion chamber 214, where fuel is injected and mixed with the highly pressure air and ignited. The high energy airflow exiting the combustion chamber 214 turns blades 224 of the turbines 220 and 222, which are coupled to respective ones of the shafts 216 and 218. Rotation of the shafts 216 and 218 turns vanes 226 of the compressors 210 and 212. The heated air is exhausted via a nozzle (not shown) where it mixes with cool air, provided by the fan 204, that bypasses the engine core to produce forward thrust.

To supply various systems of an aircraft with pressurized air, the example bleed air system 202 diverts or extracts some of the compressed air (e.g., bleed air) from the compressor 208 prior to the combustion chamber 214. In the illustrated example, the bleed air system 202 includes a turbo-compressor 230 having a compressor 232 and a turbine 234. In particular, the compressor 232 of the illustrated example has a compressor inlet 236 fluidly coupled to a bleed port 238 of the low-pressure compressor 210. A conduit or passageway 240 fluidly couples the bleed port 238 of the low-pressure compressor 210 and the compressor inlet 236. The compressor 232 of the turbo-compressor 230 compresses the bleed air extracted from the low-pressure compressor 210 to provide a relatively higher pressure bleed air at a compressor outlet 242. The example bleed air system 202 does not employ a precooler. Thus, unlike known systems, the example bleed air system 202 described herein does not dump or waste air provided by the fan 204, thereby increasing the efficiency of the engine 200.

To prevent back flow pressure to the low-pressure compressor 210, the bleed air system 202 of the illustrated example employs a flow control member or back-flow preventer 244 (e.g., a check valve). The flow control member 244 is disposed between the bleed port 238 of the low-pressure compressor 210 and the compressor inlet 236 to prevent pressurized airflow toward the low-pressure compressor 210 of the engine 200 during a pressure surge produced by the turbo-compressor 230. In other words, if the compressor 232 generates a back pressure at the compressor inlet 236 that is greater than the pressure of the bleed air extracted from the low-pressure compressor 210 of the engine 200, the flow control member 244 prevents the higher pressure bleed air from flowing from the compressor inlet 236 into the low-pressure compressor 210.

In the illustrated example, the compressor inlet 236 is fluidly coupled to a low-pressure source such as, for example, a fifth stage of the low-pressure compressor 210. Although in the illustrated example the compressor inlet 236 receives bleed air from a dedicated compressor stage (e.g., a fifth stage) of the low-pressure compressor 210, the compressor inlet 236 may alternatively receive bleed air from another stage of the low-pressure compressor 210 (e.g., a fourth stage, an eighth stage, etc.).

Additionally or alternatively, in some examples, the compressor inlet 236 may be fluidly coupled to high-pressure source or a stage of the high-pressure compressor 212. In some such examples, the example bleed air system 202 may include dual-inlet bleed air ports. In that case, a first port provides bleed air to the compressor inlet 236 from a first stage (e.g., a low-pressure stage such as the fifth stage) of the low-pressure compressor 210 and a second port provides bleed air to the compressor inlet 236 from a second stage (e.g., a low-pressure stage such as the eighth stage) of the low-pressure compressor 210 or a stage of the high-pressure compressor 212 (e.g., a high-pressure stage such as a fifteenth stage). In some such examples, one or more flow control apparatus or valves may be employed to direct the bleed air from either one of the dual ports to the compressor inlet 236. For example, when the engine is operating at a relatively high thrust (e.g., during take-off and/or cruising altitudes), the flow control apparatus may direct bleed air from the low-pressure compressor 210. Alternatively, when the engine is operating at a relatively low thrust (e.g., when idle), the flow control apparatus directs bleed flow to the compressor inlet 236 from a higher stage of the low-pressure compressor 210 or the high-pressure compressor 212.

As shown in FIG. 2, the compressor outlet 242 is fluidly coupled to a control system 246 of an aircraft. For example, a passageway or conduit 248 fluidly couples the compressor outlet 242 to an environmental control system 250 (ECS). The ECS 250 conditions the bleed air provided by the compressor outlet 242 to a cabin pressure and/or cabin temperature. For example, the ECS 250 may include one or more ECS packs (e.g., an air cycle refrigeration system) that receive the bleed air from the turbo-compressor 230 and condition or regulate the bleed air to cabin pressure and/or temperature. A flow control member 252 (e.g., a pressure reducing regulator) is disposed between the compressor outlet 242 and the ECS 250. For example, the flow control member 252 may be configured to regulate the pressure of the bleed air at the compressor outlet 242 to a pre-set or predetermined pressure value prior to supplying the bleed air to the ECS 250. Additionally, the flow control member 252 may provide fluid flow shut-off (e.g., a pressure reducing shut-off valve or PRSOV).

The compressor outlet 242 of the illustrated example is also fluidly coupled to a thermal anti-icing system 254. In the illustrated example, the thermal anti-icing system 254 is a wing anti-icing system. The passageway 248 fluidly couples the compressor outlet 242 to a passageway or conduit 256 of the wing anti-icing system 254. A flow control member 258 may be disposed between the compressor outlet 242 and the wing anti-icing system 254. As shown, the flow control member 258 and/or the passageway 256 are fluidly coupled to the passageway 248 downstream from the flow control member 252. However, in other examples, the flow control member 258 and/or the passageway 256 may be fluidly coupled to the passageway 248 upstream from the flow control member 252. The flow control member 258 of the illustrated example is a pressure regulator that regulates the pressure of the bleed air to a pre-set pressure suitable for the wing anti-icing system 254. Additionally, the flow control member 258 may also be a shut-off valve (e.g., a PRSOV).

To drive the compressor 232, the turbo-compressor 230 employs the turbine 234. The turbine 234 is operatively coupled to the compressor 232 via a shaft 260. To drive the turbine 234, a turbine inlet 262 is fluidly coupled to the high-pressure compressor 212 of the engine 200. A conduit or passageway 264 fluidly couples a bleed port 266 of the high-pressure compressor 212 of the engine 200 and the turbine inlet 262. For example, the bleed port 266 of the illustrated example fluidly couples a fifteenth stage of the high-pressure compressor 212 to the turbine inlet 262. However, in other examples, the turbine inlet 262 may be fluidly coupled to any other stage of the high-pressure compressor 212. To regulate the pressure of the bleed air extracted from the high-pressure compressor 212 to a pre-set or predetermined pressure value prior to flowing into the turbine inlet 262, the bleed air system 202 of the illustrated example employs a flow control member or pressure regulator 268. As shown in FIG. 2, the flow control member 268 is disposed within the passageway 264 between the high-pressure compressor 212 and the turbine inlet 262. Additionally, the flow control member 268 may also be a shut-off valve (e.g., a PRSOV). High-pressure bleed air provided by the high-pressure compressor 212 drives the turbine 234 which, in turn, drives the compressor 232 via the shaft 260. The turbine 234 converts thermal energy provided by the bleed air of the high-pressure compressor 212 into mechanical energy by expanding the hot, high-pressure bleed air provided by the high-pressure compressor 212 to a lower temperature and pressure.

A turbine outlet 270 is fluidly coupled to a thermal anti-icing system 272 of the aircraft 100. In the illustrated example of FIG. 2, the thermal anti-icing system 272 is an engine anti-icing system. A conduit or passageway 274 fluidly couples the turbine outlet 270 and the engine anti-icing system 272 to enable the bleed air at the turbine outlet 270 to supply the engine anti-icing system 272. The engine anti-icing system 272 of the illustrated example is configured to dump the bleed air exiting the turbine outlet 270. As shown in FIG. 2, a flow control member or pressure regulator 276 is disposed within the passageway 274 between the turbine outlet 270 and the engine anti-icing system 272. For example, the flow control member 276 may regulate a pressure of the bleed air at the turbine outlet 270 prior to supplying the engine anti-icing system 272. Additionally, the flow control member 276 may also be a shut-off valve (e.g., a PRSOV). Although not shown, in other examples, the bleed air provided at the turbine outlet 270 may also be used to supply the wing anti-icing system 254.

In operation, the turbine 234 receives high-pressure bleed air from the high-pressure compressor 212 of the engine 200. The turbine 234 operates the compressor 232 and the bleed air exits the turbine outlet 270 to supply the engine anti-icing system 272. The compressor 232 receives low-pressure bleed air from the low-pressure compressor 210 of the engine 200 and compresses the low-pressure bleed air to a relatively higher pressure bleed air to supply the ECS 250 and/or the wing anti-icing system 254.

The bleed air system 202 may employ a control system 280 to operate the various flow control members 252, 258, 268 and 276. The control system 280 of the illustrated example includes a microprocessor 282, an input/output module 284, a comparator 286, and a valve controller 288. For example, a sensor 290 downstream of the flow control member 252 may provide a signal corresponding to a pressure of the bleed air prior to flowing to the ECS 250 to the microprocessor 282 via the input/output module 284. The control system 280 may determine if the downstream pressure measured by the sensor 290 is within a pre-determined pressure range for a given altitude and/or a given speed of the aircraft. For example, the comparator 286 may compare the signal provided by the sensor 290 with a pressure threshold or range provided, for example, by a look-up table. If the pressure is outside of the range, the control system 280 may cause the flow control member 252 to adjust the bleed air pressure to within the predetermined pressure range. The control system 280 may operate the other flow control members 258, 268 and 276 in a similar manner. In some examples, the control system may cause the flow control members 252, 258, 268 and 276 to operate between a closed position to restrict fluid flow through the respective passageways 248, 256, 264 or systems 250, 254, 272. Further, the control system 280 may be part of a main control system 292 of the aircraft.

Figure 3:
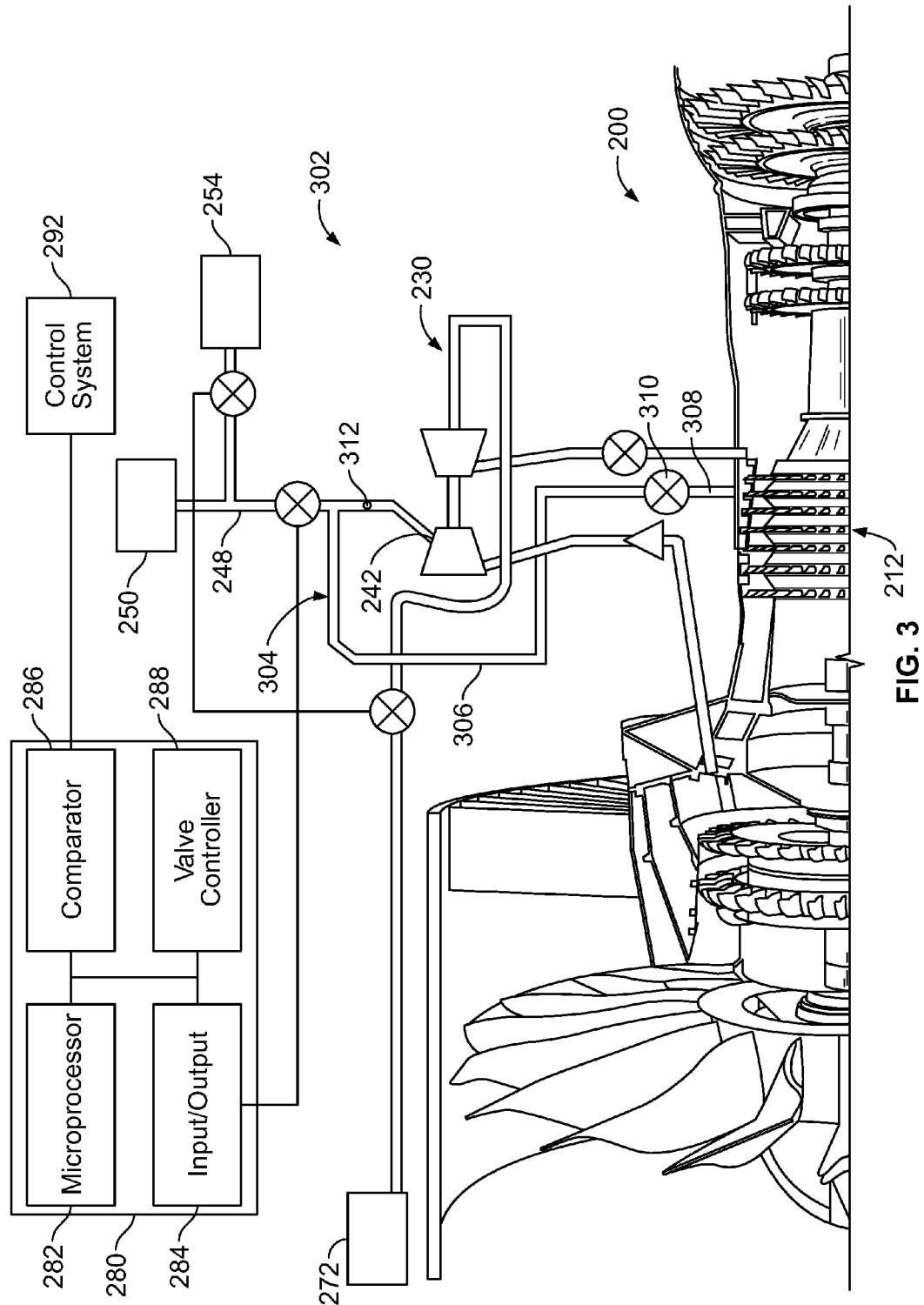
FIG. 3 illustrates another aircraft engine having another example bleed air system disclosed herein.

FIG. 3 is illustrates another example bleed air system 302 described herein. Those components of the example bleed air system 302 that are substantially similar or identical to the components of the example bleed air system 202 described above and that have functions substantially similar or identical to the functions of those components will not be described in detail again below. Instead, the interested reader is referred to the above corresponding descriptions. To facilitate this process, similar reference numbers will be used for like structures.

Referring to FIG. 3, the example bleed air system 302 employs a supplemental bleed air bypass system 304. In particular, the supplemental bleed air bypass system 304 fluidly couples bleed air from the high-pressure compressor 212 to the compressor outlet 242. As shown in FIG. 3, the supplemental bleed air bypass system 304 includes a conduit or passageway 306 to fluidly couple a bleed port 308 of the high-pressure compressor 212 to the passageway 248 downstream from the compressor outlet 242. For example, if a bleed air system (e.g., the bleed air system 202) of another engine 200 cannot provide adequate pressurized air to the ECS 250 and/or the wing anti-icing system 254, the supplemental bleed air bypass system 304 boosts the pressure and/or temperature to the ECS 250 and/or the wing anti-icing system 254. In this manner, the turbo-compressor 230 can be sized smaller than a turbo-compressor that may otherwise be needed to support two or more aircraft systems (ECS and/or anti-icing systems). Thus, the supplemental bleed air bypass system 304 enables the turbo-compressor 230 to have a relatively smaller dimensional envelope.

The supplemental bleed air bypass system 304 may employ a flow control apparatus 310 such as, for example, a digital pressure regulated shut-off valve. The flow control apparatus 310 of the illustrated example is disposed in the passageway 306 between the bleed port 308 of the high-pressure compressor 212 and the passageway 248 downstream from the compressor outlet 242. A sensor 312 may be employed to detect or measure the pressure and/or temperature of the bleed air downstream from the compressor outlet 242 and generate a signal corresponding to the measured pressure and/or temperature to the control system 280. The control system 280 receives the signal from the sensor 312 and may be configured to compare the measured pressure and/or temperature to a threshold value via the comparator 286. If the pressure and/or temperature of the bleed air are less than a threshold value, then the control system 280 may cause the flow control apparatus 310 to move to an open position to allow bleed air from the high-pressure compressor 212 to flow to the passageway 248 downstream of the compressor outlet 242. Alternatively, the control system 280 may operate the flow control apparatus 310 (e.g., move it to an open position) if the control system 280 receives a signal (e.g., from a main control system 292) indicating that a bleed air system of another engine of the aircraft is not providing adequately pressurized bleed air.

Figure 4:
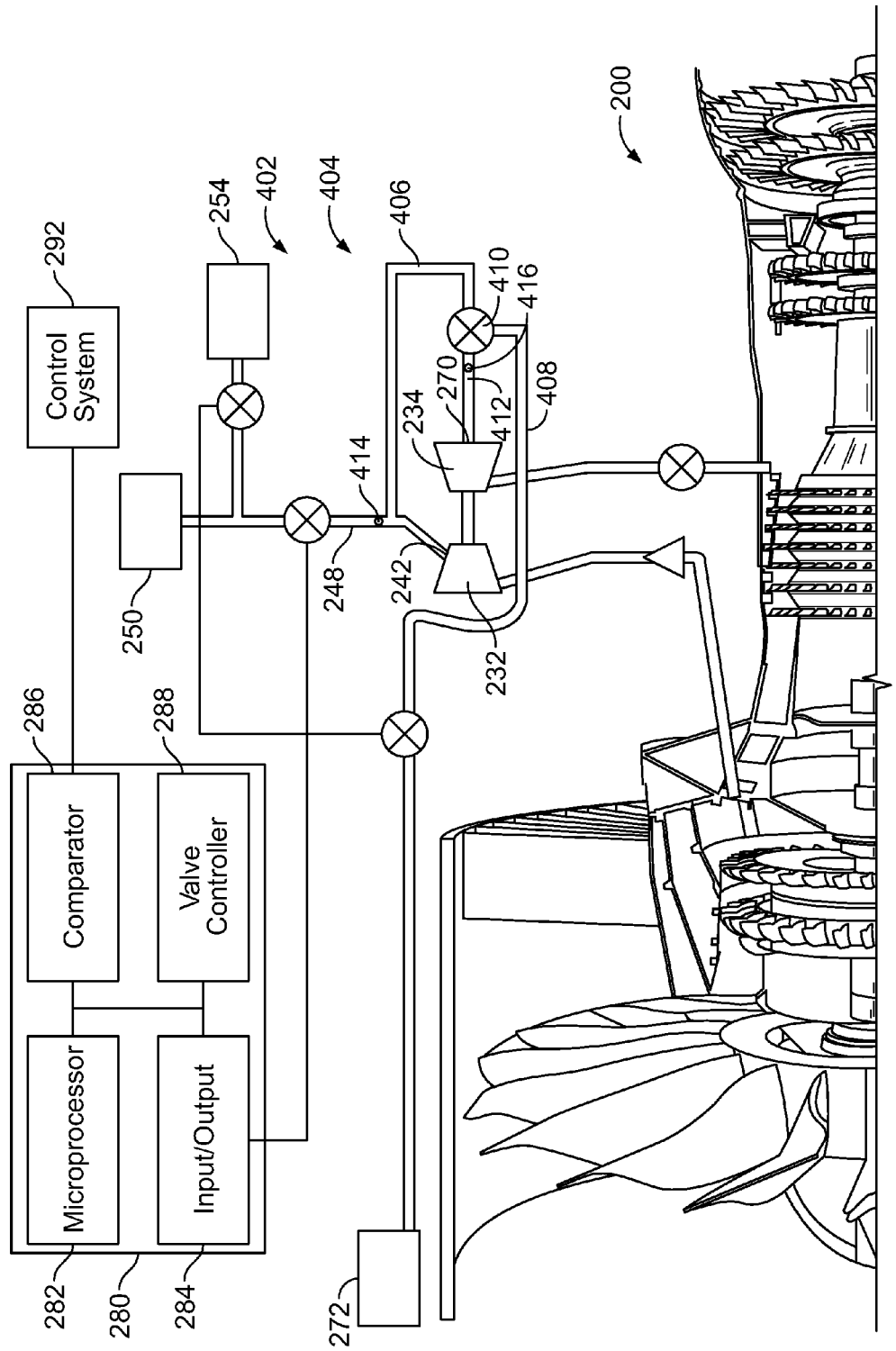
FIG. 4 illustrates another aircraft engine having another example bleed air system disclosed herein.

FIG. 4 illustrates another example bleed air system 402 described herein. Those components of the example bleed air system 402 that are substantially similar or identical to the components of the example bleed air system 202 described above and that have functions substantially similar or identical to the functions of those components will not be described in detail again below. Instead, the interested reader is referred to the above corresponding descriptions. To facilitate this process, similar reference numbers will be used for like structures. Also, although not shown, the example bleed air system 402 may also employ the supplemental bleed air bypass system 304 of FIG. 3.

The bleed air system 402 of FIG. 4 includes a mix-flow bypass system 404. The mix-flow bypass system 404 of the illustrated example fluidly couples the turbine outlet 270 and the compressor outlet 242 to enable the bleed air from the turbine outlet 270 to mix with bleed air provided at the compressor outlet 242. In particular, the mix-flow bypass system 404 enables the bleed air at the turbine outlet 270 to mix with the bleed air downstream from the compressor outlet 242 when the respective pressures of the bleed air at the turbine outlet 270 and the compressor outlet 242 are substantially equal. As a result, a lesser amount of bleed air from the turbine outlet 270 is dumped overboard via the engine anti-icing system 272 during operation.

In the illustrated example of FIG. 4, a first passageway or conduit 406 fluidly couples the turbine outlet 270 and the passageway 248 downstream of the compressor outlet 242 and a second passageway or conduit 408 fluidly couples the turbine outlet 270 and the engine anti-icing system 272. A flow control apparatus or valve 410 such as, for example, a three-way pressure regulating valve is disposed between the turbine outlet 270, the compressor outlet 242 and the engine anti-icing system 272. In operation, the flow control member 410 receives bleed air from the turbine outlet 270 via a passageway 412 and the flow control member 410 directs the bleed air to the passageway 406 and/or the passageway 408.

A first sensor 414 such as, for example, a pressure sensor detects or measures the pressure (e.g., the static pressure) of the bleed air at the compressor outlet 242 and a second sensor 416 such as, for example, a pressure sensor detects or measures the pressure (e.g., the static pressure) of the bleed air at the turbine outlet 270. The sensors 414 and 416 provide respective signals to the control system 280 of the aircraft 100 via the input/output module 284. The control system 280, via the comparator 286, compares the pressure values corresponding to the signal values provided by the sensors 414 and 416. The microprocessor 282 commands the valve controller 288 to operate the flow control apparatus 410 based on the compared pressure values. For example, the flow control apparatus 410 may be a digital pressure regulated shut-off valve.

In operation, if a comparison between the measured pressure of the bleed air at the compressor outlet 242 and the measured pressure of the bleed air at the turbine outlet 270 indicate that the pressures are substantially equal, the control system 280 sends a signal to the valve controller 288, which operates the flow control apparatus 410 to allow bleed air at the turbine outlet 270 to flow to the compressor outlet 242. In this manner, the bleed air at the turbine outlet 270 mixes with the bleed air at the compressor outlet 242, resulting in less bleed air being dumped overboard during operation. Additionally or alternatively, the flow control apparatus 410 may be configured to regulate or reduce the pressure of the bleed air at the turbine outlet 270 to substantially match the pressure of the bleed air at the compressor outlet 242 prior to mixing. Further, during a mixing operation, the flow control apparatus 410 may be configured to also provide bleed air from the turbine outlet 270 to engine anti-icing system 272 via the passageway 408. Thus, the mix-flow bypass system 404 may direct all of the bleed air at the turbine outlet 270 to the compressor outlet 242 or only a portion of the bleed air at the turbine outlet 270 to the compressor outlet 242.

Unbalanced pressures between the turbine outlet 270 and the compressor outlet 242 may alter or affect the operation of the compressor 232 and/or the turbine 234. For example, a pressure (e.g., a back pressure) provided by the bleed air at the compressor outlet 242 that is greater than the pressure of the bleed air at the turbine outlet 270 may affect the operation of the turbine 234, and a pressure (e.g., a back pressure) provided by the bleed air at the turbine outlet 270 that is greater than the pressure of the bleed air at the compressor outlet 242 may affect the operation of the compressor 232. Thus, if the sensors 414 and 416 provide signals indicating that the respective pressures of the bleed air at the compressor outlet 242 and the turbine outlet 270 are different or outside a predetermined pressure range (e.g., are less than, greater than or outside of a certain pressure range), the control system 280 causes the flow control apparatus 410 to prevent the bleed air at the turbine outlet 270 from flowing to the compressor outlet 242 via the passageway 406 and the control system 280 causes the flow control apparatus 410 to allow the bleed air at the turbine outlet 270 to flow to the engine anti-icing system 272.

As noted above, the example system of FIG. 4 reduces an amount of bleed air that is dumped overboard during operation. As a result, the efficiency of the engine 200 increases because the amount of energy stored in the bleed air is used in various systems (e.g., the ECS 250, the wing anti-icing system 254, etc.) of the aircraft and not dumped overboard, wasted or lost.

Figure 5:
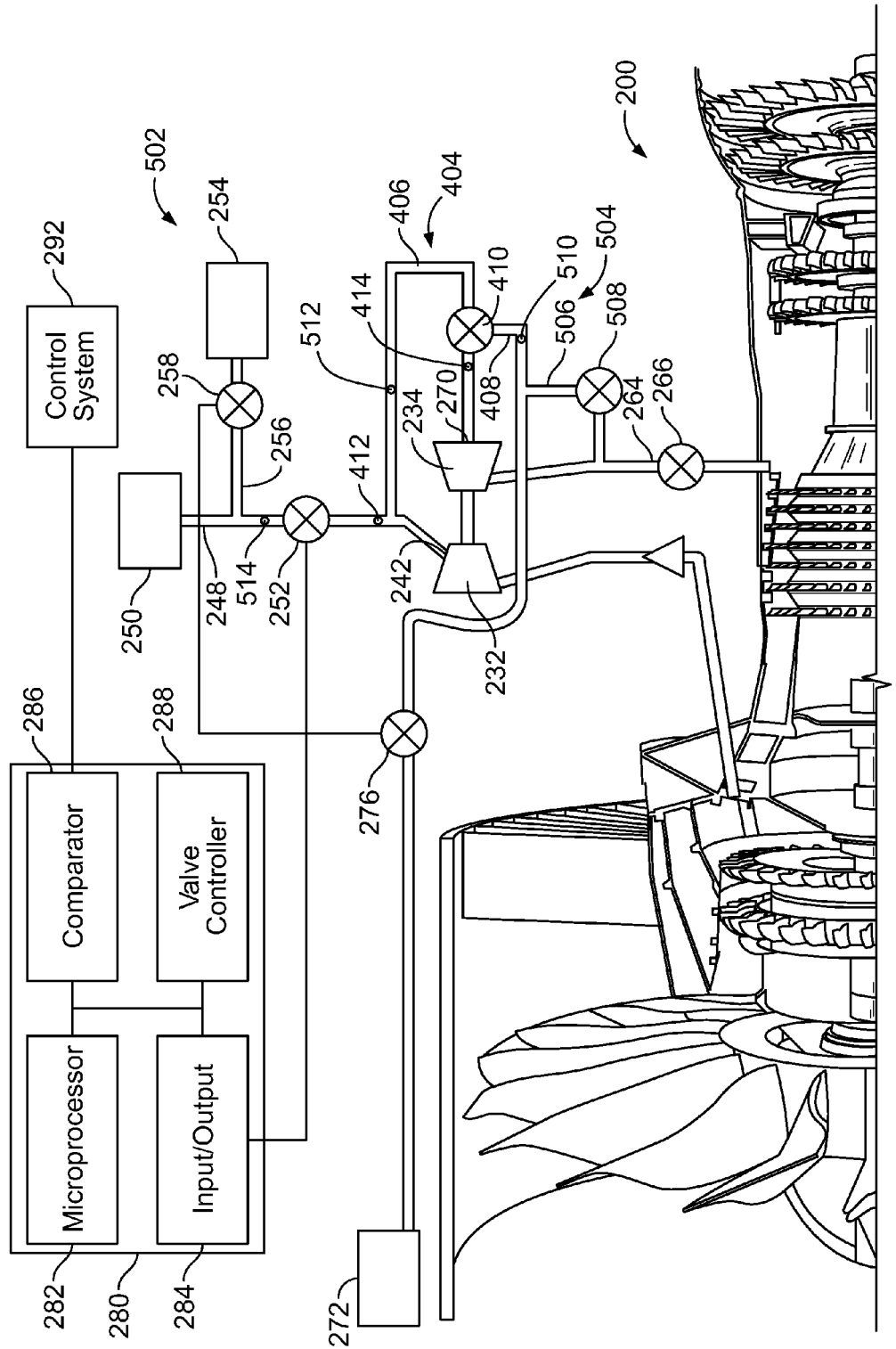
FIG. 5 illustrates another aircraft engine having another example bleed air system disclosed herein.

FIG. 5 illustrates another example bleed air system 502 described herein. Those components of the example bleed air system 502 that are substantially similar or identical to the components of the example bleed air systems 202 and 402 described above and that have functions substantially similar or identical to the functions of those components will not be described in detail again below. Instead, the interested reader is referred to the above corresponding descriptions. To facilitate this process, similar reference numbers will be used for like structures.

The example bleed air system 502 of FIG. 5 includes an anti-icing boost bypass system 504. The anti-icing boost bypass system 504 of the illustrated example provides a higher temperature and/or higher pressure fluid to supplement or supply a thermal anti-icing system such as, for example, the engine anti-icing system 272. For example, during certain operating conditions of the engine 200 (e.g., when the engine 200 is idle), the engine 200 may operate with relatively lower power settings. As a result, a pressure and/or temperature of the bleed air at the turbine outlet 270 may be lower than a minimum temperature needed for the engine anti-icing system 272. To increase the pressure and/or the temperature of the bleed air at the turbine outlet 270, the anti-icing boost bypass system 504 boosts the temperature of the bleed air provided to the engine anti-icing system 272.

To boost the temperature of the bleed air supplied to the engine anti-icing system 272, the anti-icing boost bypass system 504 allows bleed air from the high-pressure bleed port 266 to flow directly to the engine anti-icing system 272 via a passageway or conduit 506. To control the flow of fluid through the passageway 506, the anti-icing boost bypass system 504 employs a flow control apparatus or regulator valve 508 disposed between the bleed port 266 and the passageway 506. For example, the flow control apparatus 508 is a digital pressure regulating valve. The passageway 264 fluidly couples the flow control apparatus 508 to the high-pressure compressor 212 and the passageway 506 fluidly couples the flow control apparatus 508 to the passageway 408 of the engine anti-icing system 272. As a result, the anti-icing boost bypass system 504 provides a higher temperature bleed air to the engine anti-icing system 272 without impacting or affecting the temperature of the bleed air used for a passenger cabin of the aircraft and provided by the ECS 250. The anti-icing boost bypass system 504 may be an ejector conduit.

Additionally or alternatively, the anti-icing boost bypass system 504 may be fluidly coupled to the ECS 250 and/or the wing anti-icing system 254 to provide higher pressure and/or temperature bleed air from the high-pressure compressor 212 to the compressor outlet 242 via the flow control apparatus 410 and the passageways 406, 408 and 506. Such an example may include one or more pressure regulators and/or flow control apparatus to regulate the pressure of the bleed air from the anti-icing boost bypass system 504 to a pressure of the bleed air downstream of the compressor outlet 242. Alternatively, although not shown, the example bleed air system 502 of FIG. 5 may employ the supplemental bleed air bypass system 304 of FIG. 3 instead of the anti-icing boost bypass system 504 providing the bleed air to the ECS 250 and/or the wing anti-icing system 254.

To determine whether a pressure and/or temperature boost to the engine anti-icing system 272, the ECS 250 and/or the wing anti-icing system 254 is needed, the anti-icing boost bypass system 504 employs the control system 280. The control system 280 may employ one or more sensors 510, 512, 514 such as, for example, temperature sensor (e.g., a thermocouple) or a pressure sensor to measure the pressure and/or the temperature at the turbine outlet 270 flowing to the engine anti-icing system 272 and/or at the compressor outlet 242. The pressure/temperature sensors 510, 512, 514 provide a signal to the control system 280 representative of the pressure and/or the temperature of the bleed air in the passageways 248, 406 and/or 408. For example, if the control system 280 determines that the pressure and/or the temperature of the bleed air in the passageway 408 is below a minimum threshold pressure and/or temperature value, then the control system 280 causes the valve controller 288 to operate the flow control apparatus 508 to allow the bleed air from the high-pressure compressor 212 to flow to the engine anti-icing system 272 via the passageways 506 and 408. If the pressure and/or the temperature of the bleed air in the passageway 408 are greater than the temperature threshold value, the control system 280 causes the flow control apparatus 508 to prevent the bleed air from the high-pressure compressor 212 from flowing to the engine anti-icing system 272 via the passageway 506. Further, if the control system 280 determines that a pressure and/or temperature boost is needed downstream of the compressor outlet 242, then the control system 280 may be configured to cause the flow control apparatus 410 to allow fluid flow from the passageway 506 and 406.

Alternatively, in the example bleed air systems 202, 302, 402, 502 described above (and 602 and 702 described below), the control system 280 may operate the various flow control members 252, 258, 268, 276, 310, 410 and/or 508 based on the operating conditions of the engine 200. For example, during operation, different engine speeds and/or different altitudes significantly vary the pressure and/or temperature of the bleed air provided by the low-pressure compressor 210 and the high-pressure compressor 212. For example, during high-thrust operation, the pressure of the bleed air provided both the low-pressure compressor 210 and the high-pressure compressor 212 is significantly higher than the pressure of the bleed air provided when the engine 200 is at idle. Therefore, the control system 280 may receive indication of the operating parameters or conditions (from the various sensors 290, 312, 414, 416, 510, 512, 514, 616 and/or main control system 292) of the engine 200 and may operate the various flow control members 252, 258, 268, 310, 410 and/or 508 accordingly. For example, if the control system 280 determines that the engine 200 is idle, the control system 280 may cause the flow control apparatus 508 to move to an open position to allow higher temperature and/or higher pressure bleed air to flow from the high-pressure compressor 212 to the engine anti-icing system 272.

Also, because the anti-icing boost bypass system 504 employs the flow control apparatus 508, the engine anti-icing flow control apparatus 276 (e.g., a pressure regulator) may be removed. Otherwise, as shown in FIG. 5, the engine anti-icing flow control apparatus 276 provides a redundant or safety valve apparatus. In yet other examples, the mix-flow bypass system 404 described in FIG. 4 may be removed from the bleed air system 502 described in FIG. 5.

Figure 6:
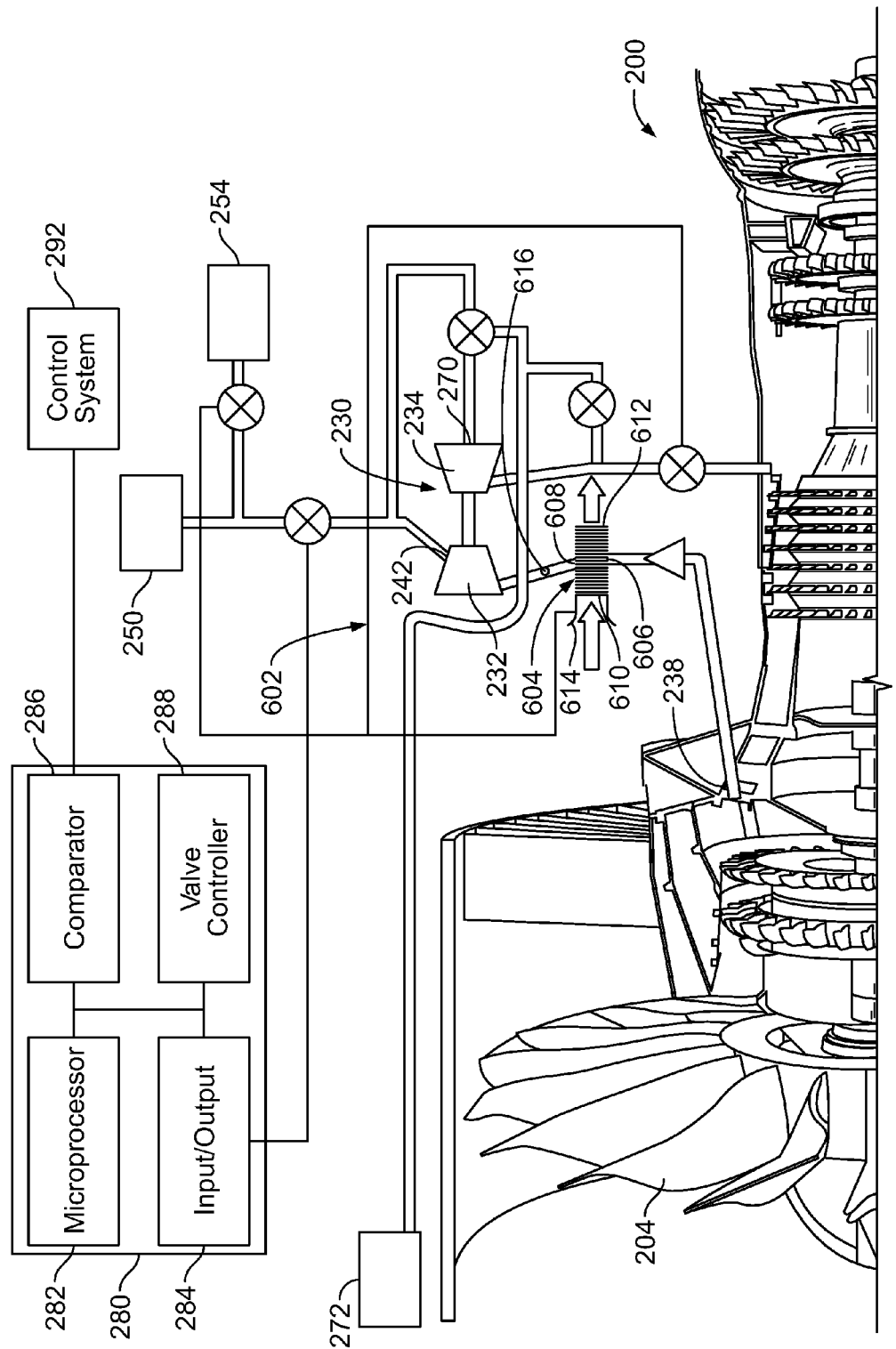
FIG. 6 illustrates another example aircraft engine disclosed herein.

FIG. 6 illustrates another example bleed air system 602 described herein. Those components of the example bleed air system 602 that are substantially similar or identical to the components of the example bleed air system 202 described above and that have functions substantially similar or identical to the functions of those components will not be described in detail again below. Instead, the interested reader is referred to the above corresponding descriptions. To facilitate this process, similar reference numbers will be used for like structures. Also, although not shown, the example bleed air system 602 may employ the supplemental bleed air bypass system 304 of FIG. 3. Further, the intercooler 604 of the FIG. 6 may be employed with the other example bleed air systems 104, 202, 302, 402, 502, and 702 disclosed herein.

Unlike the bleed air systems 104, 202, 302, 402, 502 and 702 disclosed herein, the example bleed air system 602 employs an intercooler 604 (e.g., an air-to-air heat exchanger). The bleed air system 602 of FIG. 6 includes the turbo-compressor 230 having the compressor 232 and the turbine 234. In particular, the compressor inlet 236 of the compressor 232 is fluidly coupled to the bleed port 238 of the low-pressure compressor 210. Prior to the compressor inlet 236 receiving the bleed air from the bleed port 238, the bleed air flows through the intercooler 604 between an intercooler inlet 606 and an intercooler outlet 608. To cool the bleed air, the intercooler 604 receives air provided by the fan 204 of the engine 200. The fan air flows through the intercooler 604 between an inlet 610 and an outlet 612. The cooler fan air flowing between the inlet 610 and the outlet 612 reduces the temperature of the bleed air flowing between the intercooler inlet 606 and the intercooler outlet 608.

To control the temperature of the bleed air at the intercooler outlet 608, the bleed air system 602 employs a fan air valve 614. The fan air valve 614 varies the cooling fan airflow provided by the fan 204, and thereby controls the air temperature of the bleed air at the pre-cooler outlet 608. Alternatively, the intercooler 604 may receive ambient air from an atmospheric inlet.

The bleed air system 604 of the illustrated example employs a sensor 616 (e.g., a temperature sensor) downstream from intercooler outlet 608 to sense or detect the temperature of the bleed air. The sensor 616 sends the signal corresponding to the temperature of the bleed air at the intercooler outlet 608 to the control system 280. The control system 280 determines if the temperature value at the intercooler outlet 608 is at or within a threshold value or range. For example, if the control system 280 determines (e.g., via the comparator) that the temperature of the bleed air is greater than a threshold temperature value, then the control system 280 instructs the valve controller 288 to command the fan air valve 614 to allow more fan air flow into the inlet 610. If the temperature of the bleed air at the intercooler outlet 608 is less than the threshold value, then the control system 280 commands the valve controller 288 to reduce the amount of fan air flowing to the inlet 610. The fan air exiting the outlet 612 is dumped overboard. In some examples, the fan air exiting the outlet 612 of the intercooler 604 may be routed for use in other systems of the aircraft.

Unlike known pre-coolers, the intercooler 604 of the illustrated example employs a substantially smaller dimensional envelope and weight because the intercooler 604 does not need to be sized to hold a minimum volume as required by known bleed air systems employing a known pre-cooler. Further, the intercooler 604 enables provision of a relatively smaller sized turbo-compressor (e.g., smaller than the turbo-compressor 230). Additionally or alternatively, the intercooler 604 significantly reduces a temperature of the bleed air at the compressor outlet 242 (e.g., a discharge temperature of the turbo-compressor compressor 230). As a result, the intercooler 604 reduces the amount of cooling that is typically provided by the ECS 250. In this manner, the size and or the number of ECS pack heat exchangers of the ECS 250 can be reduced, resulting in less aircraft drag. By significantly reducing the bleed air temperature at the compressor outlet 242, the intercooler 604 performs some of the cooling function that is typically provided by the ECS 250.

Figure 7:
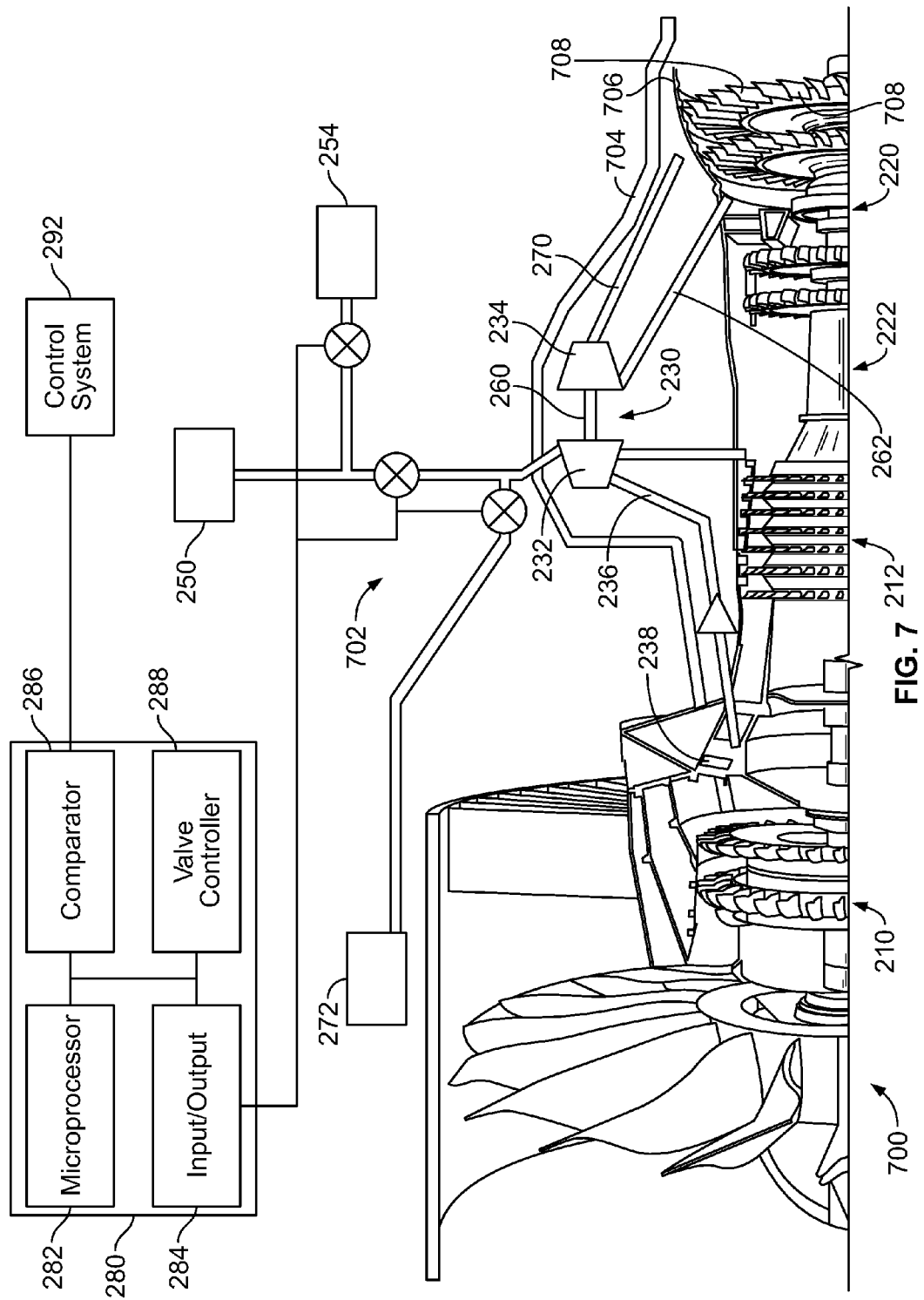
FIG. 7 illustrates another aircraft engine having another example bleed air system disclosed herein.

FIG. 7 is a partial cut-away view of another example aircraft engine 700 having another example bleed air system 702 described herein. Those components of the example engine 700 and the bleed air system 702 that are substantially similar or identical to the components of the engine 200 and the example bleed air system 202 described above and that have functions substantially similar or identical to the functions of those components will not be described in detail again below. Instead, the interested reader is referred to the above corresponding descriptions. To facilitate this process, similar reference numbers will be used for like structures.

In the illustrated example, the bleed air system 702 employs the turbo-compressor 230 disposed within a housing 704 of the engine 700. The compressor 232 of FIG. 7 receives low-pressure bleed air from the low-pressure bleed port 238 of the engine 700. More specifically, as shown in FIG. 7, the compressor inlet 236 receives bleed air from a fifth stage of the low-pressure compressor 210 and provides compressed or pressurized air to, for example, the thermal anti-icing systems 254, 272, an environmental control system 250 and/or any other system of the aircraft that operates via compressed air. In some examples, the bleed air system 702 may employ a dual inlet source to enable the compressor 232 to receive bleed air from a high-pressure source (e.g., the high-pressure compressor 212) during a first period of operation (e.g., when the engine 700 is idle) and enable the compressor 232 to draw bleed air from a low-pressure source during a second period of operation (e.g., during cruising altitudes).

In the illustrated example, the turbine 234, via the turbine inlet 262, receives high-pressure bleed air from the high-pressure turbine 222 of the engine 700. Although not shown, the turbine 234 may alternatively receive bleed air from a high-pressure compressor 212 (e.g., any one of the different stages). In some examples, the bleed air system 702 may employ a dual inlet source to enable the turbine 234 to receive bleed air from a high-pressure source (e.g., the high-pressure turbine 222) during a first period of operation (e.g., when the engine 700 is idle) and enable the turbine 234 to draw bleed air from a lower-pressure stage of the turbine 222 and/or the high-pressure compressor 212 during a second period of operation (e.g., during take-off). As noted above, the turbine 234 receives the bleed air to operate the compressor 232 via the shaft 260.

In the illustrated example, the lower temperature bleed air discharged from the turbine 234 is used for cooling. In general, the turbine outlet 270 may be fluidly coupled to a system (e.g., a second or other system of the aircraft 100) requiring cooling. For example, as shown in FIG. 7, the turbine outlet 270 of the illustrated example discharges into a low-pressure (LP) turbine casing 706. In particular, the cooled bleed air discharged from the turbine 234 can be used to cool turbine blades 708, the casing 706, etc. Cooling the casing 706 and/or the blades 708, for example, maintains a proper clearance or spacing between the turbine blades 708 and the casing 706 (e.g., prevents shrinkage and/or expansion due to elevated temperatures). In other examples, the turbine outlet 270 may be fluidly coupled to cool other portions of the turbine 222, 224 and/or any other component of the aircraft engine 700 or the aircraft. In some examples, the bleed air system 702 may be combined with anyone of the example bleed air systems 104, 202, 302, 402, 502 and 602 disclosed above. For example, the turbine outlet 270 may discharge bleed air for cooling and/or for use in the anti-icing system 272.

Figure 8:
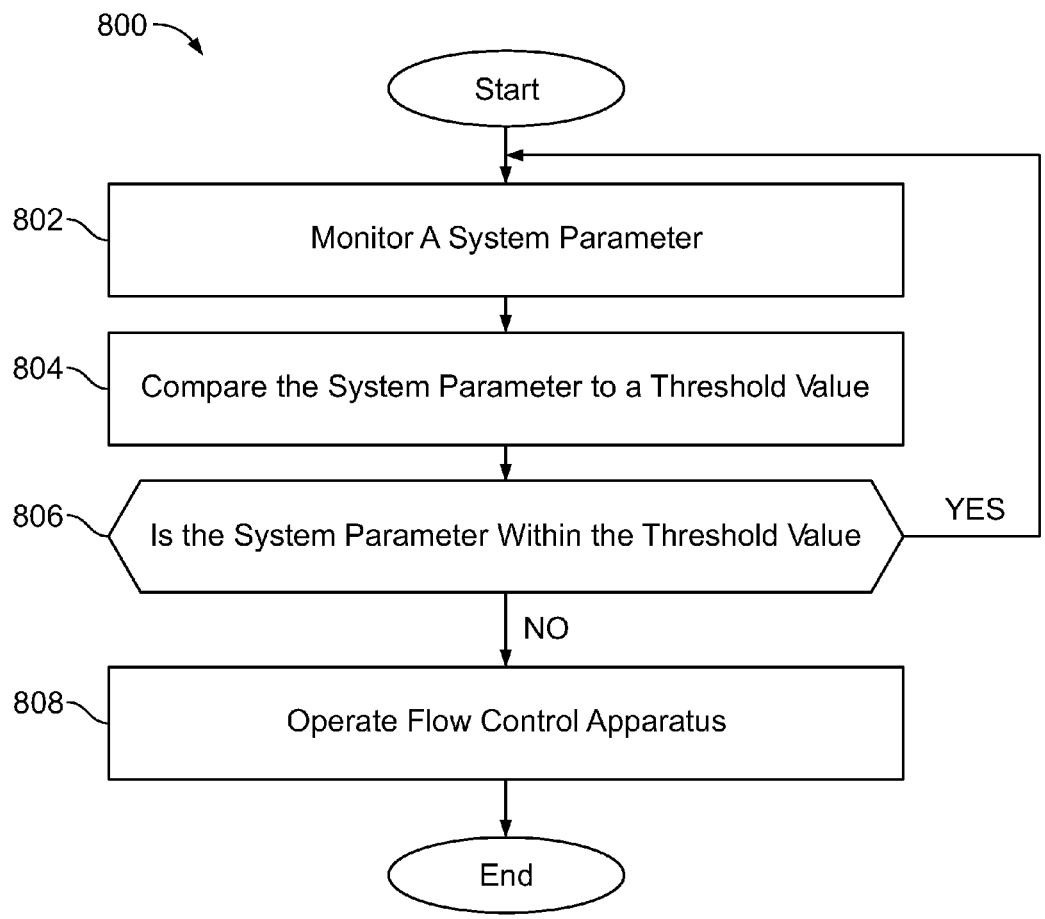
FIG. 8 is a flowchart representative of an example method that may be performed by the example bleed air systems of FIGS. 1B and 2-7.

FIG. 8 is a flowchart representative of an example method that may be implemented with an example bleed air system such as, for example, the bleed air systems 104, 202, 302, 402, 502, 602 and/or 702 of FIGS. 1B and 2-7 and/or a control system such as the control system 280 of FIGS. 2-7. In this example, the method comprises a program for execution by a processor such as the processor 282 shown in the example control system 280. The program may be embodied in software stored on a tangible computer readable medium such as a CD-ROM, a floppy disk, a hard drive, a digital versatile disk (DVD), or a memory associated with the processor and/or the control system 280, but the entire program and/or parts thereof could alternatively be executed by a device other than the processor 282 and/or embodied in firmware or dedicated hardware. Further, although the example program is described with reference to the flowchart illustrated in FIG. 8, many other methods of implementing the example control system 280 and/or the valve controller 288 may alternatively be used. For example, the order of execution of the blocks may be changed, and/or some of the blocks described may be changed, eliminated, or combined.

As mentioned above, the example method or process of FIG. 8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

For purposes of discussion, the example process 800 of FIG. 8 is described in connection with the example control system 280 and the example valve controller 288. In this manner, each of the example operations of the example process 800 of FIG. 8 is an example manner of implementing a corresponding one or more operations performed by one or more of the blocks of the example control system 280 or the valve controller 288 of FIGS. 2-7.

Turning in detail to FIG. 8, the control system 280 monitors a system parameter of a bleed air system (block 802). For example, the control system 280 may be configured to monitor one or more system parameters of the example bleed air systems 104, 202, 302, 402, 502, 602 and/or 702 disclosed herein. To monitor a system parameter, the control system 280 receives one or more signals from the sensors 290, 312, 414, 416, 510, 512, 514, 616 and/or main control system 292. For example, a system parameter may include a pressure of bleed air, a temperature of the bleed air, a speed of the engine 200, an altitude of the aircraft, etc. The control system 280 receives the signals via the input/output module 284.

The control system 280 compares the system parameter to a threshold value (block 804). For example, the control system 280 can compare, via the comparator 286, the pressure and/or temperature of the bleed air received via the sensors 290, 312, 414, 416, 510, 512, 514, 616 to respective threshold values retrieved from a look-up table or storage or with the other values received by the sensors 290, 312, 414, 416, 510, 512, 514, 616. In some examples, the system parameter and/or the threshold value may be based on other operating conditions of the aircraft.

The control system 280 may then determine if the system parameter measured by, for example, the sensors 290, 312, 414, 416, 510, 512, 514, 616 is within the threshold value (block 806). If the system parameter is within the threshold value, then the control system 280 returns to block 802 to continue monitoring the system parameter. For example, if the pressure of the bleed air at the turbine outlet 270 is substantially equal to the pressure at the compressor outlet 242, the control system 280 may cause the flow control member 410 to remain in an open position to enable flow via the mix-flow bypass system 404.

If the control system 280 determines that the system parameter is not within the threshold value, then the control system 280 commands the valve controller 288 to operate a flow control member (block 808). For example, if the pressure of the bleed air at the turbine outlet 270 is not substantially equal to the pressure at the compressor outlet 242, the control system 280 may cause the flow control member 410 to move to a closed position to prevent flow via the mix-flow bypass system 404.

Figure 9:
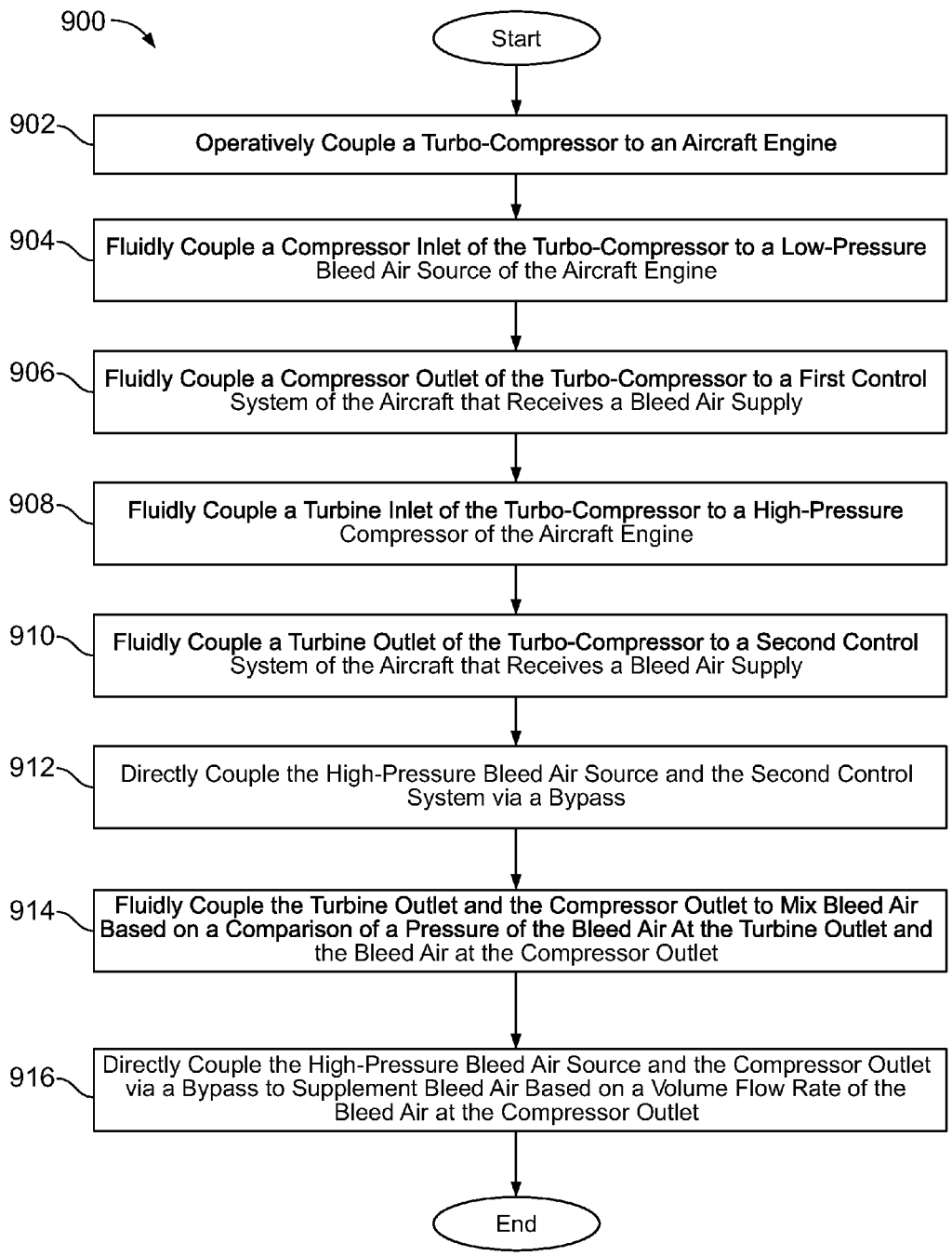
FIG. 9 is a flowchart illustrating a method of implementing the example bleed air systems of FIGS. 1B and 2-7.

FIG. 9 is a flowchart of an example method of implementing the example bleed air systems 202, 302, 402, 502, 602 and/or 702 in accordance with the teachings of this disclosure. While an example manner of implementing the example bleed air systems, one or more of the blocks and/or processes illustrated in FIG. 8 may be combined, divided, re-arranged, omitted, eliminated and/or implemented in any other way. Further still, the example method of FIG. 9 may include one or more processes and/or blocks in addition to, or instead of, those illustrated in FIG. 9, and/or may include more than one of any or all of the illustrated processes and/or blocks. Further, although the example method 900 is described with reference to the flow chart illustrated in FIG. 9, many other methods of implementing a bleed air system may alternatively be used.

Referring to FIG. 9, the turbo-compressor 230 is operatively coupled to the engine 200 of an aircraft (block 902). The compressor inlet 236 of the turbo-compressor 230 is fluidly coupled to a low-pressure bleed air source via, for example, the bleed port 238 and the passageway 240 (block 904). The compressor outlet 242 of the turbo-compressor 230 is fluidly coupled, via the passageway 248, to a first system of the aircraft such as, for example, the ECS 250, wing anti-icing system 254, etc. (block 906). The turbine inlet 262 of the turbo-compressor 230 is fluidly coupled to the high-pressure compressor 212 of the engine 200 via the passageway 264 (block 908), and the turbine outlet 270 of the turbo-compressor 230 is fluidly coupled to the second control system of the aircraft such as, for example, the engine anti-icing system 272 (block 910). Additionally or alternatively, the turbine outlet 270 of the turbo-compressor 230 may be coupled to a system of the aircraft 100 requiring cooling such as, for example a low-pressure (LP) turbine casing 706. (block 910).

In some examples, the high-pressure bleed air source or bleed port 266 may be directly or fluidly coupled to the second control system 272 via a boost bypass system 504 (block 912).

In some examples, the turbine outlet 270 and the compressor outlet 242 may be fluidly coupled to mix bleed air based on a comparison of a pressure of the bleed air at the turbine outlet 270 and the bleed air at the compressor outlet 242 (block 914). For example, the mix-flow bypass system 404 may be employed to fluidly couple the turbine outlet 270 and the compressor outlet 242.

In some examples, the high-pressure bleed air source (e.g., the high-pressure compressor 212) may be fluidly coupled to the compressor outlet 242 to bypass the turbo-compressor 230 and supplement bleed air based on a volume flow rate of the bleed air at the compressor outlet 242 (block 916). For example, the high-pressure bleed air source 212 may be fluidly coupled to the compressor outlet 242 via the supplemental bleed air bypass system 304.

Figure 10:
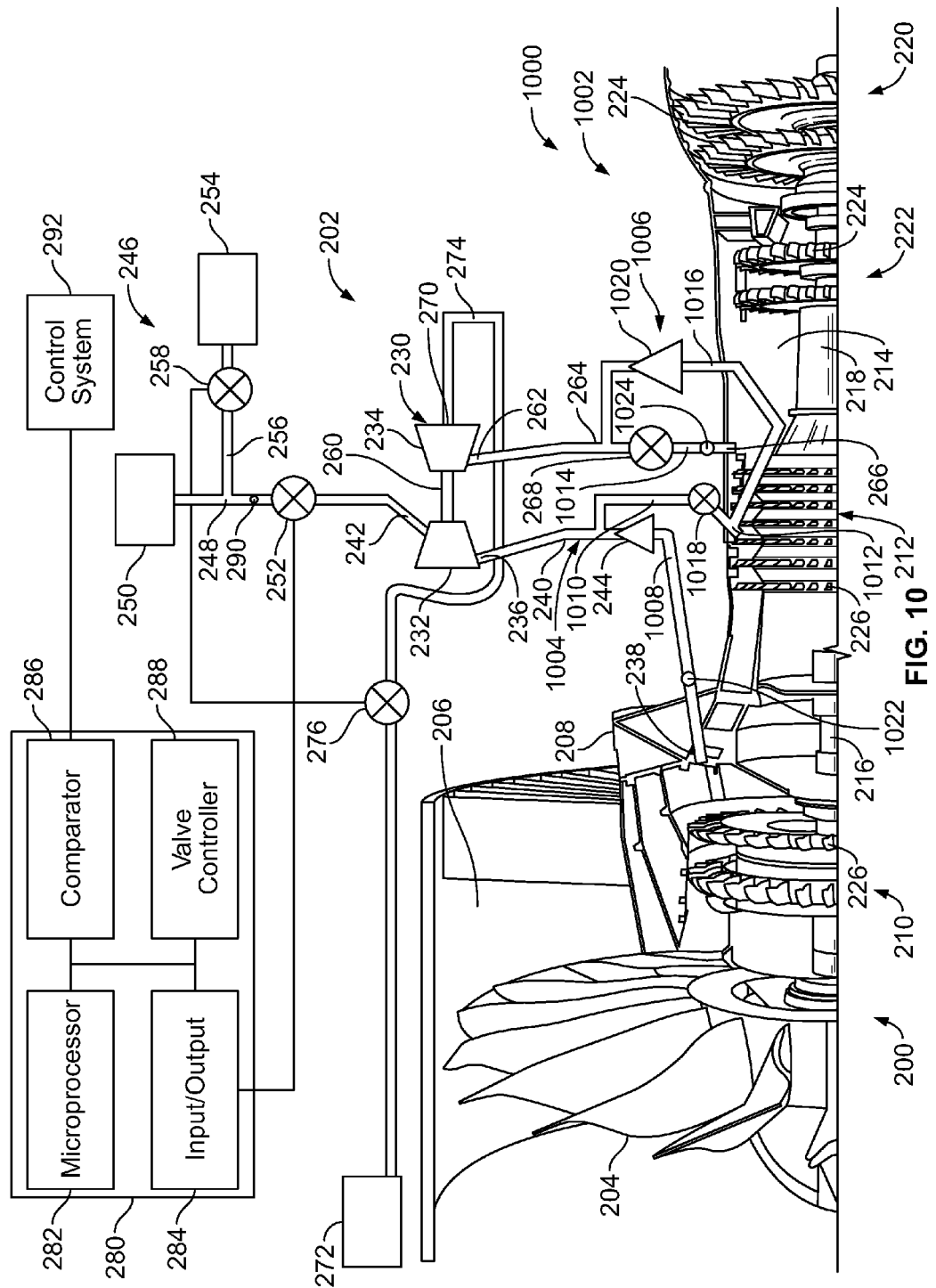
FIG. 10 illustrates another aircraft engine having another example bleed air system disclosed herein.

FIG. 10 illustrates another example bleed air system 1000 described herein. Those components of the example bleed air system 1000 that are substantially similar or identical to the components of the example engine 200 or the example bleed air system 202 described above and that have functions substantially similar or identical to the functions of those components will not be described in detail again below. Instead, the interested reader is referred to the above corresponding descriptions. To facilitate this process, similar reference numbers will be used for like structures.

Referring to FIG. 10, the example bleed air system 1000 employs dual-inlet bleed air system 1002. The dual-inlet bleed air system 1002 includes a first dual-inlet bleed air system 1004 associated with the compressor 232 of the turbo-compressor 230 and a second dual-inlet bleed air system 1006 associated with the turbine 234 of the turbo-compressor 230. In this manner, the compressor 232 is capable of receiving bleed air at different pressures and/or temperatures from different stages of the low-pressure compressor 210 and/or the high-pressure compressor 212 and the turbine 234 is capable of receiving bleed air at different pressures and/or temperatures from different stages of the high-pressure compressor 212 and/or the low-pressure compressor 210. For example, the first dual-inlet bleed air system 1004 can provide bleed air to the compressor 232 from a fifth stage of the low-pressure compressor 210 or an eighth stage of the high-pressure compressor 210. Likewise, the second dual-inlet bleed air system 1006 can provide bleed air to the turbine 234 from a fifteenth stage of the high-pressure compressor 212 or the eighth stage of the high-pressure compressor 212.

As a result, bleed air having different pressures and/or temperatures may be utilized during different flight conditions to meet pressure and/or temperature demands of the control system 246 (e.g., the ECS 250, the wing anti-icing system 254, the engine anti-icing system 272, etc.), while reducing a dimensional envelope (e.g., size and weight) of the turbo-compressor 230. For example, when the engine 200 is operating at a relatively high thrust (e.g., during take-off and/or cruising altitudes), the bleed air from the low-pressure compressor 210 may have a higher pressure and/or temperature than, for example, the bleed air from the low-pressure compressor 210 when the engine is operating at a relatively low thrust (e.g., when idle). Thus, to ensure that the pressure and/or temperature of the bleed air from the low-pressure compressor 210 is sufficient to meet the demands of the control systems 246, a turbo-compressor is typically sized (e.g., to provide a 10 to 1 ratio) based on the pressure and/or temperature of the bleed air during the low thrust conditions. Thus, a turbo-compressor may have a relatively larger dimensional envelope to meet the demands of the control system 246 during low thrust conditions than a turbo-compressor needed to meet the demands of the control system 246 during high trust conditions. Thus, by using dual inlets, bleed air from a higher stage of the low-pressure compressor 210 and/or the high-pressure compressor 212 may be provided to the turbo-compressor 230 during different flight conditions. By providing bleed air to the turbo-compressor 230 from a higher pressure source of the compressors 210 and 212 during low thrust conditions (e.g., non-flight conditions or when the aircraft is idle), the turbo-compressor 230 (e.g., a 5 to 1 ratio) of the illustrated example may be sized based on the higher pressure bleed air, resulting in a turbo-compressor 230 having a relatively smaller dimensional envelope, thereby reducing weight and costs associated with the aircraft 100.

As shown in the illustrated example, the first dual-inlet bleed air system 1004 fluidly couples the compressor inlet 236 to the low-pressure compressor 210 and the high-pressure compressor 212. As shown, the first dual-inlet bleed air system 1004 includes a first inlet passageway 1008 and a second inlet passageway 1010. For example, the first inlet passageway 1008 fluidly couples the compressor inlet 236 to the low-pressure port 238 of the low-pressure compressor 210 and the second inlet passageway 1010 fluidly couples the compressor inlet 236 to a low-pressure port or intermediate port 1012 of the high-pressure compressor 212. For example, the low-pressure port 238 may provide fluid from a fifth stage of the low-pressure compressor 210 and the intermediate port 1012 may provide fluid from an eighth stage of the high-pressure compressor 212. As noted above, the pressure of the bleed air at the intermediate port 1012 is greater than the pressure of the bleed air at the low-pressure port 238.

Similarly, the second dual-inlet bleed air system 1002 fluidly couples the turbine 234 of the turbo-compressor 230 to different stages of the high-pressure compressor 212. As shown in the illustrated example, the second dual-inlet bleed air system 1006 includes a third inlet passageway 1014 and a fourth inlet passageway 1016. For example, the third inlet passageway 1014 fluidly couples the turbine inlet 262 and the high-pressure port 266 of the high-pressure compressor 212 and the fourth inlet passageway 1016 fluidly couples the turbine inlet 262 and the intermediate port 1012 of the high-pressure compressor 212. The high-pressure port 266 may provide bleed air from a fifteenth stage of the high-pressure compressor 212 and the intermediate port 1012 may provide bleed air from the eighth stage of the high-pressure compressor 212. The pressure of the bleed air at the high-pressure port 266 is greater than the pressure of the bleed air at the intermediate port 1012.

As shown, the compressor inlet 236 and the turbine inlet 262 are fluidly coupled to a common port (i.e., the intermediate port 1012). However, in other examples, the compressor inlet 236 or the turbine inlet 262 may not be fluidly coupled to a common port. Thus, in some examples, the dual-inlet bleed air system 1002 provides bleed air to the compressor 232 and the turbine 234 from a common stage of the low-pressure compressor 210 and/or the high-pressure compressor 212 or from different stages of the lower-pressure compressor 210 and/or the high-pressure compressor 212.

To direct the bleed air from either one of the ports 238 and 1012 to the compressor inlet 236 and/or either one of the ports 266 and 1012 to the turbine inlet 262, the dual-inlet bleed air system 1002 employs one or more flow control members or valves 244, 268, 1018, 1020. For example, to control fluid flow between the low-pressure port 238 or the intermediate port 1012 and the compressor inlet 236, the first dual-inlet bleed air system 1004 employs the flow control member 244 (e.g., a check valve) coupled to the first inlet passageway 1008 and the flow control member 1018 (e.g., a pressure-relief shut-off valve) coupled to the second inlet passageway 1010. In particular, the flow control member 244 is positioned between the low-pressure port 238 and the compressor inlet 236 and the flow control member 1018 is positioned between the intermediate port 1012 and the compressor inlet 236. In addition, the first inlet passageway 1008 and the second inlet passageway 1010 converge into the passageway 240 downstream from the respective flow control members 244 and 1018 and upstream from the compressor inlet 236.

Likewise, to control fluid flow between the turbine inlet 262 and the high-pressure port 266 or the intermediate port 1012, the second dual-inlet bleed air system 1006 employs the flow control member 268 coupled to the third inlet passageway 1014 and the flow control member 1020 coupled to the fourth inlet passageway 1016. In particular, the flow control member 268 is positioned between the high-pressure port 266 and the turbine inlet 262 and the flow control member 1020 is positioned between the intermediate port 1012 and the turbine inlet 262. The third inlet passageway 1014 and the fourth inlet passageway 1016 converge into the passageway 264 downstream from the respective flow control members 268 and 1020 and upstream from the turbine inlet 262.

The flow control member 244 of the first dual-inlet bleed air system 1004 shown in the illustrated example is a check valve or back flow preventer that allows fluid flow in one direction based on a pressure differential across the flow control member 244. More specifically, when the pressure of the bleed air upstream from the flow control member 244 (e.g., at the port 238) is greater than the pressure of the bleed air downstream from the flow control member 244 (e.g., at the compressor inlet 236), the flow control member 244 moves to an open position to allow bleed air to flow from the low-pressure port 238 to the compressor inlet 236. However, if the pressure downstream from the flow control member 244 (e.g., at the compressor inlet 236) is greater than the pressure of the bleed air upstream from the flow control member 244 (i.e., at the low-pressure port 238), the flow control member moves to a closed position to prevent fluid flow across the flow control member 244 between the low-pressure port 238 and the compressor inlet 236.

Likewise, the flow control member 1020 of the second dual-inlet bleed air system 1006 shown in the illustrated example is a check valve or back flow preventer that allows fluid flow in one direction based on a pressure differential across the flow control member 1020. More specifically, when the pressure of the bleed air upstream from the flow control member 1020 (e.g., at the intermediate port 1012) is greater than the pressure of the bleed air downstream from the flow control member 1020 (e.g., at the turbine inlet 262), the flow control member 1020 moves to a closed position preventing fluid flow across the flow control member 1020 between the intermediate port 1012 and the turbine inlet 262. However, if the pressure of the bleed air upstream from the flow control member 1020 (e.g., at the turbine inlet 262) is less than the pressure of the bleed air downstream from the flow control member 244 (i.e., at the intermediate port 1012), the flow control member 1020 moves to an open position to allow bleed air to flow from the intermediate port 1012 to the turbine inlet 262.

The flow control members 244 and 1020 of the illustrated example move between the open and closed positions based on the operation of the respective flow control members 1018 and 268. The flow control members 1018 and 268 of the respective first and second dual-inlet bleed air systems 1004 and 1006 shown in the illustrated example are pressure relief shut-off valves. Each of the flow control members 1018 and 268 is controllable or movable between an open position and a closed position. For example, when the flow control member 1018 of the first dual-inlet bleed air system 1004 is an open position, bleed air from the intermediate port 1012 flows through the flow control member 1018 to the compressor inlet 236 via the second inlet passageway 1010 and the passageway 240. As a result, because the pressure of the bleed air at the intermediate port 1012 is greater than the pressure of the bleed air at the low-pressure port 238, the pressure of the bleed air at the compressor inlet 236 (e.g., at an outlet of the flow control member 244) is greater than the pressure of the bleed air at the low-pressure port 238. Thus, the pressure differential across the flow control member 244 causes the flow control member 244 to move to a closed position, thereby preventing fluid flow from the low-pressure port 238 to the compressor inlet 236 via the first inlet passageway 1008. However, when the flow control member 1018 moves to a closed position, the bleed air from the intermediate port 1012 is prevented from flowing to the compressor inlet 236. Thus, the pressure of the bleed air at the compressor inlet 236 decreases. In turn, the pressure differential across the flow control member 244 causes the flow control member 244 to move to the open position when the pressure downstream from the flow control member 244 is less than the pressure of the bleed air upstream from the flow control member 244, thereby allowing fluid flow from the low-pressure port 238 to the compressor inlet 236 via the first inlet passageway 1008 and the passageway 240. In other words, when the flow control member 1018 moves to an open position, the compressor inlet 236 receives bleed air from the intermediate port 1012 via the second inlet passageway 1010 and when the flow control member 1018 moves to a closed position, the compressor inlet 236 receives bleed air from the low-pressure port 238 via the first inlet passageway 1008.

Similarly, when the flow control member 268 of the second dual-inlet bleed air system 1006 moves to an open position, bleed air from the high-pressure port 266 flows through the flow control member 268 to the turbine inlet 262 via the third inlet passageway 1014 and the passageway 264. As a result, the pressure of the bleed air upstream from the flow control member 1020 (e.g., at the intermediate port 1012) is greater than the pressure of the bleed air downstream from the flow control member 1020 (e.g., at the intermediate port 1012). As a result, the pressure differential across the flow control member 1020 causes the flow control member 1020 to move to a closed position, thereby preventing fluid flow between the turbine inlet 262 and the intermediate port 1012 via the fourth inlet passageway 1016. When the flow control member 268 moves to a closed position, the bleed air from the high-pressure port 266 is prevented from flowing to the turbine inlet 262. Thus, the pressure of the bleed air at the turbine inlet 262 decreases. In turn, when a pressure downstream from the flow control member 1020 (e.g., at the turbine inlet 262) is less than the pressure of the bleed air upstream from the flow control member 1020 (e.g., at the intermediate port 1012), the flow control member 1020 moves to an open position allowing the bleed air from the intermediate port 1012 to flow to the turbine inlet 262 via the fourth inlet passageway 1016 and the passageway 264. In other words, when the flow control member 268 moves to a closed position, the turbine inlet 262 receives bleed air from the intermediate port 1012 and when the flow control member 268 moves to an open position, the turbine inlet 262 receives bleed air from the high-pressure port 266.

The first dual-inlet bleed air system 1004 may be controlled independently from the second dual-inlet bleed air system 1006. For example, the flow control members 1018 and 268 may be operated independently of each other such that the compressor inlet 236 can receive bleed air from the intermediate port 1012 while the turbine inlet 262 receives bleed air from the high-pressure port 266; the compressor inlet 236 may receive bleed air from the low-pressure port 238 while the turbine inlet 262 receives bleed air from the intermediate port 1012; the compressor inlet 236 may receive bleed air from the low-pressure port 238 while the turbine inlet 262 receives bleed air from the high-pressure port 266; or the compressor inlet 236 and the turbine inlet 262 may receive bleed air from the intermediate port 1012 simultaneously. In other words, if one of the compressor 232 or the turbine 234 receives bleed air from the intermediate port 1012, the other one of the compressor 232 or the turbine 234 does not need to receive the bleed air from the intermediate port 1012 even though the second inlet passageway 1010 is in fluid communication with the fourth inlet passageway 1016.

The control system 280 may operate the flow control members 1018 and 268. As shown in the illustrated example, the bleed air system 1000 employs the control system 280 to operate the dual-inlet bleed air system 1002. For example, to operate the dual-inlet bleed air system 1002, the control system 280 may be configured to operate the flow control members 1018 and 268 of the respective first and second dual-inlet bleed air systems 1004 and 1006. In addition, the control system 280 may be configured to operate the various flow control members 252, 258 and 276 as indicated above.

The control system 280 of the illustrated example includes a microprocessor 282, an input/output module 284, a comparator 286, and a valve controller 288. For example, a sensor 1022 may provide a signal corresponding to a pressure of the bleed air to the microprocessor 282 via the input/output module 284. The control system 280 may determine if the pressure value of the low-pressure port 238 measured by the sensor 1022 is within a pre-determined pressure range and/or a pressure range for a given altitude and/or a given speed of the aircraft 100. For example, the comparator 286 may compare the signal provided by the sensor 1022 to a pressure threshold or range provided, for example, by a look-up table. Based on the comparison, the control system 280 may command the valve controller 288 to cause the flow control member 1018 to move between an open position to allow bleed air to flow from the intermediate port 1012 to the compressor inlet 236 and a closed position to allow bleed air to flow from the low-pressure port 238 to the compressor inlet 236. Likewise, the control system 280 may determine, via for example a sensor 1024, if the pressure value of the high-pressure port 266 is greater than a predetermined pressure range and/or a pressure range for a given altitude and/or a given speed of the aircraft 100. For examples, the comparator 286 may compare a signal provided by the sensor 1024 with a pressure threshold or range provided by, for example, the look-up table. Based on the comparison, the control system 280 may command the valve controller 288 to cause the flow control member 268 to move between a closed position to allow bleed air to flow from the intermediate port 1012 to the turbine inlet 262 and a closed position to allow bleed air to flow from the high-pressure port 266 to the turbine inlet 262. In some examples, the flow control members 244 and/or 1020 may be pressure control valves (e.g., similar to the flow control members 1018 and 268) that are operated via the control system 280.

In some examples, the dual-inlet bleed air system 1002 may be configured to operate manually (e.g., based on the pressures of the bleed air during high throttle or low throttle conditions). For example, the flow control members 1018 and 268 may be pressure regulators (e.g., spring operated regulators such as spring to close valves) that move between open and closed positions based on the pressure differential across the flow control members 1018 and 268 provided by the bleed air during different flight conditions (e.g., high thrust and low thrust conditions). For example, the flow control member 1018 may be configured to move to a closed position when a pressure of the bleed air at the intermediate port 1012 is greater than a predetermined or pre-set pressure value (e.g., a pressure associated with a high thrust condition) and move to an open position when the pressure of the bleed air at the intermediate port 1012 is less than the predetermined or the pre-set pressure value (e.g., a pressure indicative of a low thrust condition). Also, the flow control member 268 may be configured to move to a closed position when a pressure of the bleed air at the high-pressure port 266 is greater than a predetermined or pre-set pressure value (e.g., a pressure value associated with a high thrust condition) and an open position when the pressure of the bleed air at the high-pressure port 266 is less than the pre-determined or pre-set pressure value (e.g., a pressure value indicative of a low thrust condition).

Figure 11:
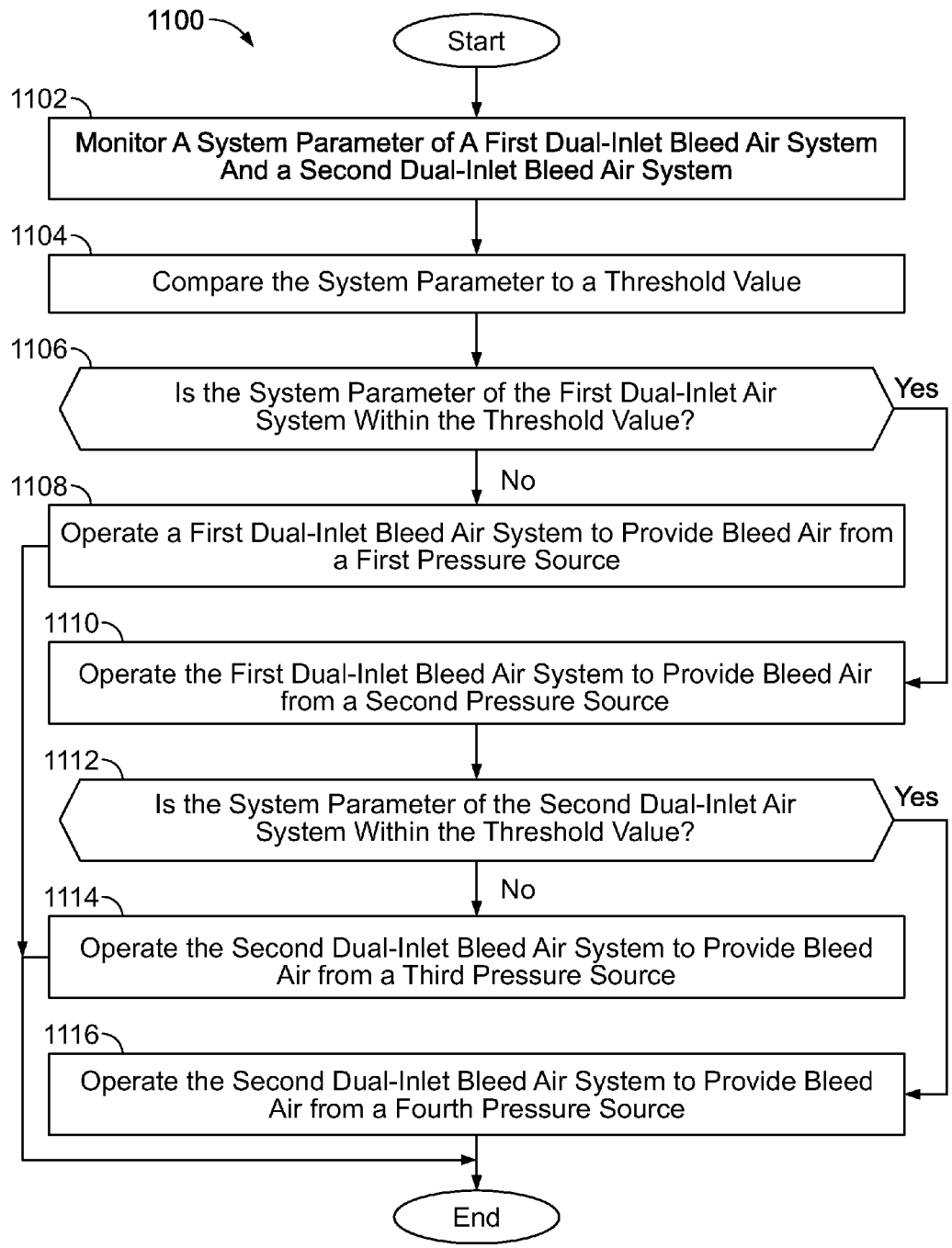
FIG. 11 is a flowchart illustrating a method of implementing the example bleed air systems of FIG. 10.

FIG. 11 is a flowchart representative of an example method 1100 that may be implemented with an example dual-inlet bleed air system such as, for example, the dual-inlet bleed air system 1002 of FIG. 10 and/or a control system such as the control system 280 of FIG. 10. In this example, the method comprises a program for execution by a processor such as the processor 282 shown in the example control system 280. The program may be embodied in software stored on a tangible computer readable medium such as a CD-ROM, a floppy disk, a hard drive, a digital versatile disk (DVD), or a memory associated with the processor and/or the control system 280, but the entire program and/or parts thereof could alternatively be executed by a device other than the processor 282 and/or embodied in firmware or dedicated hardware. Further, although the example program is described with reference to the flowchart illustrated in FIG. 11, many other methods of implementing the example control system 280 and/or the valve controller 288 may alternatively be used. For example, the order of execution of the blocks may be changed, and/or some of the blocks described may be changed, eliminated, or combined.

As mentioned above, the example method or process of FIG. 10 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 11 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

For purposes of discussion, the example process 1100 of FIG. 11 is described in connection with the example dual-inlet bleed air system 1002. In this manner, each of the example operations of the example process 1100 of FIG. 11 is an example manner of implementing a corresponding one or more operations performed by the example dual-inlet bleed air system 1002 of FIG. 10.

Turning in detail to FIG. 11, the control system 280 monitors a system parameter of the dual-inlet bleed air system 1002 (block 1102). For example, the control system 280 may be configured to monitor one or more system parameters of the example first dual-inlet bleed air system 1004 or the second dual-inlet bleed air system 1006 disclosed herein. To monitor a system parameter, the control system 280 receives one or more signals from the sensors 1022, 1024 and/or the main control system 292. For example, a system parameter may include a pressure and/or a temperature of the bleed air at the low-pressure port 238, the high-pressure port 266, a thrust condition of the engine 200, a speed of the aircraft 100 and/or an altitude of the aircraft 100 from the main control system 292, etc. The control system 280 receives the signals via the input/output module 284.

The control system 280 compares the system parameter to a threshold value (block 1104). For example, the control system 280 can compare, via the comparator 286, the measured pressure and/or temperature of the bleed air received via the sensors 1022 or 1024 to respective threshold values retrieved from a look-up table or storage, or with the other values received by the sensors 1022 or 1024.

The control system 280 may then determine if the system parameter measured by, for example, the sensors 1022 of the first dual-inlet bleed air system 1004 is within the threshold value (block 1106). If the system parameter is within the threshold value, then the control system 280 causes the first dual-inlet bleed air system 1004 to provide bleed air from a first pressure source (block 1108). For example, the control system 280 causes the flow control member 1018 to move to a closed position to allow bleed air from the low-pressure port 238 to flow to the compressor inlet 236.

If the system parameter is not within the threshold value, then the control system 280 causes the first dual-inlet bleed air system 1004 to provide bleed air from a second pressure source (block 1110). For example, the control system 280 causes the flow control member 1018 to move to an open position to allow bleed air from the intermediate port 1012 to flow to the compressor inlet 236.

The control system 280 may then determine if the system parameter measured by, for example, the sensors 1024 of the second dual-inlet bleed air system 1006 is within the threshold value (block 1112). If the system parameter is within the threshold value, then the control system 280 causes the second dual-inlet bleed air system 1006 to provide bleed air from a third pressure source (block 1114). For example, the control system 280 causes the flow control member 268 to move to an open position to allow bleed air from the high-pressure port 266 to flow to the turbine inlet 262.

If the system parameter is not within the threshold value, then the control system 280 causes the second dual-inlet bleed air system 1006 to provide bleed air from a fourth pressure source (block 1116). For example, the control system 280 causes the flow control member 268 to move to a closed position to allow bleed air from the intermediate port 1012 to flow to the turbine inlet 262.

In other examples, the system parameter may be based on a speed of the aircraft 100. For example, the control system 280 may receive a speed value representative of the aircraft speed. If the control system determines that the speed value is greater than a threshold speed value (e.g., a speed representing in-flight or relatively high thrust conditions), then the control system 280 causes the flow control members 1018 and 268 to move to their respective closed positions. If the control system 280 determines that the speed value is less than the threshold speed value, then the control system 280 causes the first and second flow control members 1018 and 268 to move to their respective open positions.

In yet other examples, the control system 280 may operate the first and second flow control members 1018 and 268 based on system parameters (e.g., pressures and/or temperatures of the bleed air) upstream from the compressor outlet 242 and/or the turbine outlet 270. For example, the control system 280 may cause the flow control members 1018 and 268 to move between their respective open and closed positions based on a comparison of the pressure and/or temperature of the bleed air at the compressor outlet 242 or the turbine outlet 270 relative to a predetermined threshold pressure or temperature value.

Figure 12:
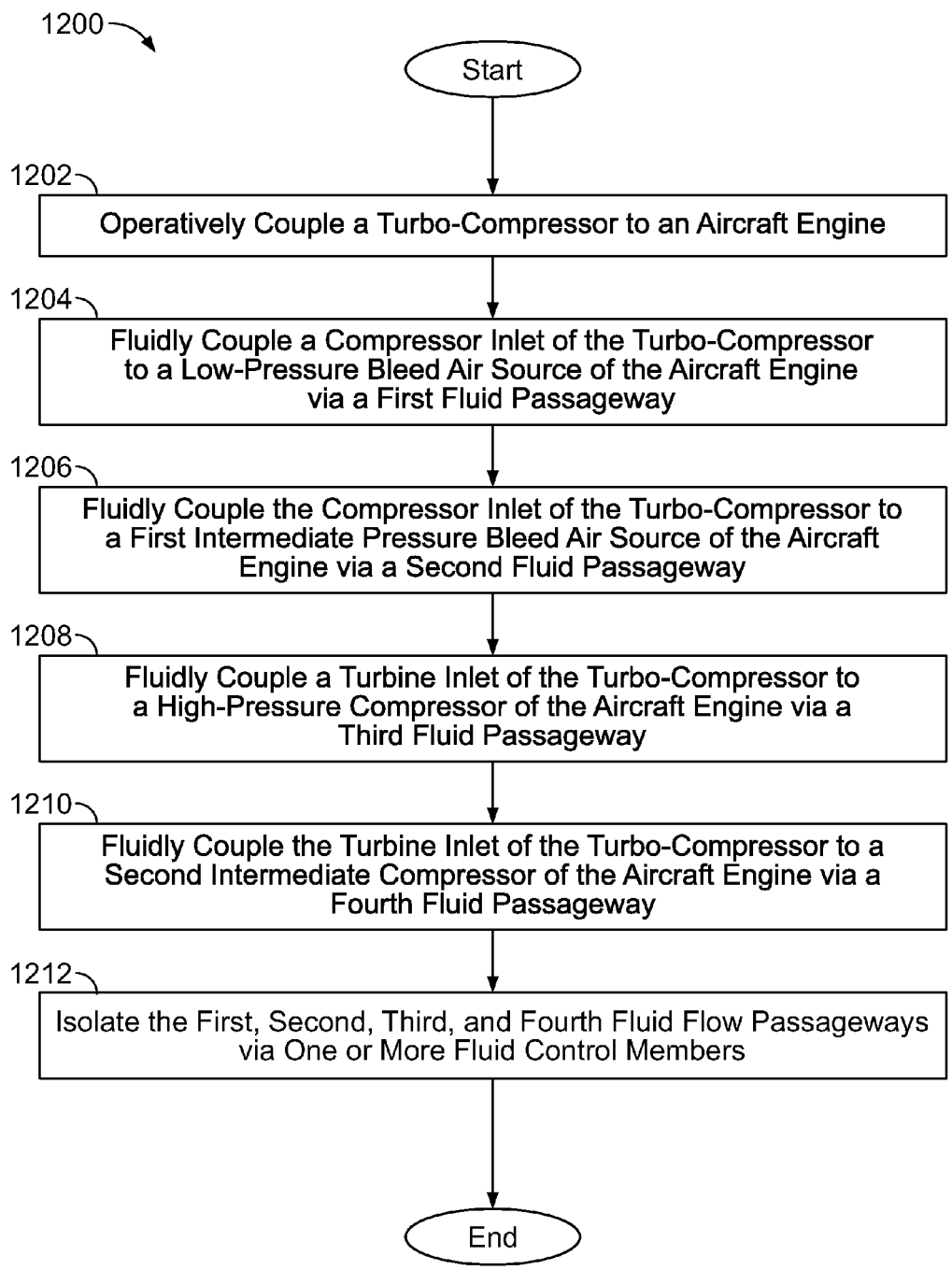
FIG. 12 is a flowchart illustrating a method of implementing the example bleed air system of FIG. 10.

FIG. 12 is a flowchart of an example method 1200 of implementing the example bleed air system 1002 in accordance with the teachings of this disclosure. While an example manner of implementing the example bleed air systems, one or more of the blocks and/or processes illustrated in FIG. 12 may be combined, divided, re-arranged, omitted, eliminated and/or implemented in any other way. Further still, the example method of FIG. 12 may include one or more processes and/or blocks in addition to, or instead of, those illustrated in FIG. 12, and/or may include more than one of any or all of the illustrated processes and/or blocks. Further, although the example method 1200 is described with reference to the flow chart illustrated in FIG. 12, many other methods of implementing the bleed air system 1002 may alternatively be used.

Referring to FIG. 12, the turbo-compressor 230 is operatively coupled to the engine 200 of the aircraft 100 (block 1202). More specifically, the turbo-compressor 230 is coupled to the engine 200 via the dual-inlet bleed air system 1002. In particular, the compressor inlet 236 of the turbo-compressor 230 is fluidly coupled to a low-pressure bleed air source via, for example the low-pressure port 238 and the first inlet passageway 1008 (block 1204). The compressor inlet 236 of the turbo-compressor 230 is fluidly coupled to an intermediate pressure bleed air source via, for example, the intermediate port 1012 and second inlet passageway 1010 (block 1206). The turbine inlet 262 of the turbo-compressor 230 is fluidly coupled to the high-pressure bleed air source of the engine 200 via, for example, the high-pressure port 266 and the third inlet passageway 1014 (block 1208), and the turbine inlet 262 of the turbo-compressor 230 is fluidly coupled to an intermediate pressure bleed air source via, for example, the intermediate port 1012 and the fourth inlet passageway 1016 (block 1210). Additionally, the first, second, third and fourth inlet passageways 1008, 1010, 1014, and 1016 are fluidly isolated via one or more fluid control devices such as, for example, the flow control members 244, 1018, 268 and 1020. (block 1212).

In some examples, the compressor inlet 236 and the turbine inlet 262 may be fluidly coupled to a common intermediate pressure bleed air source. In other examples, the compressor inlet 236 and the turbine inlet 262 may be fluidly coupled to different intermediate pressure bleed air sources.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a turbo-compressor including:
a compressor having a compressor inlet fluidly coupled to (1) a bleed air port of a low-pressure compressor of an aircraft engine and (2) an intermediate port of a high-pressure compressor of the aircraft engine, the compressor inlet to receive fluid from either the low-pressure compressor or the high-pressure compressor based on a first system parameter of the aircraft; and
a turbine having a turbine inlet fluidly coupled to (1) the intermediate port of the high-pressure compressor of the aircraft engine and (2) a high-pressure port of the high-pressure compressor of the aircraft engine, the turbine inlet to receive fluid from either the intermediate port of the high-pressure compressor or the high-pressure port of the high-pressure compressor based on a second system parameter of the aircraft, wherein the turbo-compressor is to increase a pressure of fluid received from either the bleed air port of the low-pressure compressor or the intermediate port of the high-pressure compressor, and wherein the high-pressure compressor has a higher pressure than the low-pressure compressor.

2. An apparatus of claim 1, wherein the first system parameter is substantially similar to the second system parameter.

3. An apparatus of claim 2, wherein each of the first and second system parameters comprises a speed of the aircraft.

4. An apparatus of claim 1, wherein the first system parameter comprises a first pressure value and the second system parameter comprises a second pressure value.

5. An apparatus of claim 4, wherein the compressor inlet is to receive fluid from the low-pressure compressor when a pressure of the fluid from the low-pressure compressor is greater than the first pressure value and the compressor inlet is to receive fluid from the intermediate port of the high-pressure compressor when a pressure of the fluid from the low-pressure compressor is less than the first pressure value.

6. An apparatus of claim 4, wherein the turbine inlet is to receive fluid from the intermediate port of the high-pressure compressor when a pressure of the fluid from the high-pressure port is greater than the second pressure value and the turbine inlet is to receive fluid from the high-pressure port of the high-pressure compressor when a pressure of the fluid from the high-pressure port is less than the second pressure value.

7. An apparatus as defined in claim 1, further comprising a first inlet passageway to fluidly couple the low-pressure port and the compressor inlet and a second inlet passageway to fluidly couple the intermediate port and the compressor inlet.

8. An apparatus as defined in claim 7, further comprising a third inlet passageway to fluidly couple the high-pressure port and the turbine inlet and a fourth inlet passageway to fluidly couple the intermediate port and the turbine inlet.

9. An apparatus as defined in claim 8, further comprising flow control members to control fluid flow between the first, second, third and fourth fluid inlet passageways.

10. An apparatus as defined in claim 9, wherein the flow control members comprise a first check valve fluidly coupled to the first inlet passageway between the low-pressure port and the compressor inlet, and a first shut-off valve fluidly coupled to the second inlet passageway between the intermediate port and the compressor inlet.

11. An apparatus as defined in claim 10, wherein the flow control members comprise a second shut-off valve fluidly coupled to the third inlet passageway between the high-pressure port and the turbine inlet, and a second check valve fluidly coupled to the fourth inlet passageway between the intermediate port and the turbine inlet.

12. An apparatus comprising:
a turbo-compressor comprising a compressor and a turbine, the compressor to increase a pressure of bleed air extracted from an aircraft engine at a first lower pressure to a second higher pressure to provide pressurized bleed air to a system of the aircraft;
a first inlet passageway to fluidly couple a low-pressure port of a low-pressure compressor from the aircraft engine to a compressor inlet of the turbo-compressor;
a second inlet passageway to fluidly couple a first intermediate port from a high-pressure compressor of the aircraft engine to the compressor inlet of the turbo-compressor, wherein the high-pressure compressor has a higher pressure than the low-pressure compressor;
a third inlet passageway to fluidly couple a high-pressure port from an aircraft engine to a turbine inlet of the turbine; and
a fourth inlet passageway to fluidly couple a second intermediate port from the aircraft engine to the turbine inlet.

13. An apparatus as defined in claim 12, wherein the first intermediate port and the second intermediate port are common ports.

14. An apparatus as defined in claim 12, wherein fluid flow through the first and second inlet passageways is controlled independently from the fluid flow through the third and fourth inlet passageways.

15. An apparatus as defined in claim 13, further comprising a first valve fluidly coupled to the first inlet passageway between the low-pressure port and the compressor inlet, a second valve fluidly coupled to the second inlet passageway between the intermediate port and the compressor inlet, wherein operation of the second valve between an open position and a closed position causes the first valve to move between an open position and a closed position.

16. An apparatus as defined in claim 15, further comprising a third valve fluidly coupled to the third inlet passageway between the high-pressure port and the turbine inlet, a fourth fluid valve fluidly coupled to the fourth inlet passageway between the intermediate port and the turbine inlet, wherein operation of the third valve between an open position and the closed position causes the fourth valve to move between an open position and a closed position.

17. An apparatus as defined in claim 16, wherein the first inlet passageway and the second inlet passageway converge upstream from the compressor inlet and downstream from the first and second valves, and the third inlet passageway and the fourth inlet passageway converge upstream from the turbine inlet and downstream from the third and fourth valves.

18. A method comprising:
fluidly coupling a compressor inlet of a turbo-compressor to a low-pressure bleed air source provided by a low-pressure compressor of an aircraft engine via a first inlet passageway and fluidly coupling the compressor inlet to an intermediate bleed air source provided by a high-pressure compressor of the aircraft engine via a second inlet passageway; and
fluidly coupling a turbine inlet of the turbo-compressor to a high-pressure bleed air source provided by the high-pressure compressor of the aircraft engine via a third inlet passageway and fluidly coupling the turbine inlet and the intermediate bleed air source provided by high-pressure compressor via a fourth inlet passageway, the aircraft engine comprising a housing that contains the low-pressure compressor and the high-pressure compressor of the aircraft engine, wherein the low-pressure bleed air source is provided by a low-pressure bleed air port in the housing of the aircraft engine, the intermediate bleed air source is provided by an intermediate bleed air port in the housing of the aircraft engine, and the high-pressure bleed air source is provided by a high-pressure bleed air port in the housing of the aircraft engine, wherein the turbo-compressor is to increase a pressure of bleed air received from either the low-pressure compressor or the high-pressure compressor, and wherein the high-pressure compressor has a higher pressure than the low-pressure compressor.

19. A method of claim 18, further comprising causing the compressor inlet to receive bleed air from the low-pressure bleed air source and the turbine inlet to receive bleed air from the intermediate bleed air source during a flight condition of the aircraft, and causing the compressor inlet to receive bleed air from the intermediate bleed air source and the turbine inlet to receive bleed air from the high-pressure bleed air source during a non-flight condition when the aircraft engine is idle.

20. A method of claim 18, further comprising isolating the first, second, third and fourth inlet passageways via flow control devices.

\* \* \* \* \*